United States Patent [19]

Jasinski

[11] Patent Number: 5,162,790
[45] Date of Patent: Nov. 10, 1992

[54] MULTIPLE TRANSMITTER PAGING SYSTEM

[75] Inventor: Leon Jasinski, Ft. Lauderdale, Fla.
[73] Assignee: Motorola, Inc., Schaumburg, Ill.
[21] Appl. No.: 681,656
[22] Filed: Apr. 8, 1991

Related U.S. Application Data

[63] Continuation of Ser. No. 378,558, Jul. 10, 1989, abandoned.
[51] Int. Cl.$^5$ .............................................. H04Q 7/00
[52] U.S. Cl. ........................... 340/825.44; 340/825.47; 455/16; 379/59
[58] Field of Search .......... 340/825.44, 311.1, 825.08, 340/825.47, 313; 455/33.1, 16, 54.2; 379/59, 60

[56] References Cited

U.S. PATENT DOCUMENTS

| | | | |
|---|---|---|---|
| 4,247,908 | 1/1981 | Lockhart, Jr. et al. | 455/31 |
| 4,642,632 | 2/1987 | Ohyagi et al. | 455/38 |
| 4,843,622 | 6/1989 | Yotsutani et al. | 379/59 |
| 4,918,437 | 4/1990 | Jasinski et al. | 340/825.44 |
| 4,928,096 | 5/1990 | Leonardo et al. | 340/825.44 |
| 4,951,044 | 8/1990 | Nelson et al. | 340/825.44 |
| 5,005,014 | 4/1991 | Jasinski | 340/825.44 |
| 5,014,344 | 5/1991 | Goldberg | 340/825.44 |

*Primary Examiner*—Donald J. Yusko
*Assistant Examiner*—Peter Weissman
*Attorney, Agent, or Firm*—Philip P. Macnak; William E. Koch; Thomas G. Berry

[57] ABSTRACT

A multiple transmitter wide area communication system comprises a central station having a plurality of acknowledge back receivers, each receiving acknowledge back responses on one of a plurality of acknowledge back channels, and a plurality of transmitters each transmitting on an individual channel. The system further comprises a plurality of remote stations each having an acknowledge back receiver which is capable of selectably receiving acknowledge back responses on each of the individual channels, and a transmitter which is capable of selectably transmitting on each of the individual channels. Each central station transmitter substantially simultaneously transmits at a high data bit rate on each individual channel the addresses for acknowledge back pagers for which messages are intended, and further transmits at a high data bit rate the associated messages intended only for those acknowledge back pagers which responded with an acknowledge back response. The central station then transmits at a high data bit rate on a preselected channel, in a predetermined sequence, to the remote stations the addresses and messages of only those acknowledge back pagers failing to respond to the previous address transmissions from the central station. The remote stations then simulcast transmit at a low data bit rate on the preselected channel the addresses of those acknowledge back pagers which failed to previously respond. The remote stations then transmit at a high data bit rate in a predetermined station sequence the messages intended for those acknowledge back pagers which responded with an acknowledge back signal.

21 Claims, 16 Drawing Sheets

10

20

MULTIPLE TRANSMITTER PAGING SYSTEM

This is a continuation of application Ser. No. 07/378,558, filed Jul. 10, 1989 now abandoned.

BACKGROUND OF THE INVENTION

1. Field of the Invention

This invention generally relates to the field of communication systems and more particularly to a multiple transmitter wide area communication system requiring fewer system transmitters than conventional communication systems.

2. Description of the Prior Art

Multiple transmitter communication systems are widely used. A typical prior art multiple transmitter communication system is shown in the diagram of FIG. 1. Such a system, which may be used for such purposes as radio paging, includes a number of transmitters located to provide wide area coverage to a plurality of remote paging receivers, or pagers. The coverage area provided by such prior art systems was determined by a number of factors, such as transmitter power output, transmitter antenna height, pager antenna sensitivity, type of terrain, and size and density of buildings in the coverage area. Messages to be transmitted to the remote pagers were generally simulcast throughout the system to provide the highest system through-put, while maintaining reliable message delivery throughout the system. As shown in FIG. 1, the typical system included a central station 12 having a coverage area of radius r, often surrounded wholly or partially by a plurality of remote stations 14 each having a coverage area of r'. Such prior art systems were designed to provide at least a 90% probability of signal reception within a building, and in excess of 98% probability of signal reception on the street at the zone, or cell, boundary of radius r for the central station 12 and at the cell boundary of radius r' for the remote stations 14. The area covered by the central station 12 was generally greater than covered by the remote stations 14, due to either the central station 12 having a greater transmitter power output or greater antenna height as compared to the remote stations 14. A typical paging system configured as shown in FIG. 1, provided a 90% probability of signal reception on-the-street, and approximately a 60% probability of signal reception in-building, over an area having a radius R for transmissions originated from the central station. In the typical paging system, radius R corresponds to approximately a twenty mile radius, for a total system coverage somewhat in excess of twelve hundred square miles. When information was simulcast transmitted from the central station and the remote stations, the probability of signal reception improved to in excess of 98% on-the-street and 90% in-building coverage over the area encompassed within radius R.

Paging systems, such as described in FIG. 1, have provided excellent results for a broad range of pagers operating on a wide range of frequencies, and utilizing a variety of signaling formats, such as the well known POCSAG and Golay Sequential Code (GSC) signaling formats. Such systems, however, have rapidly become limited in the ability to deliver information, as the number of subscribers operating in the system becomes large, such as in excess of several thousand subscribers, largely due to delays in queuing the messages and the corresponding reduction in system through-put. The problems have been compounded further as the amount of information to be delivered to each subscriber increases. With memory costs decreasing, pagers providing thousands of characters for message storage are realizing an increased demand. The increased storage capacity of such pagers has made such developments as information services and digitized voice transmission practical. Such increased demand for data has resulted in a need to develop pagers and systems capable of handling the increased data requirements. For the prior art system of FIG. 1, the typical method for providing increased message through-put required by the increased information input, was by increasing the bit rate at which the messages are delivered. While this method has somewhat proven to improve message through-put while minimizing the number of, and complexity of, transmitters provided in the system, there is a limit to which such bit rate increase can occur, before system problems are encountered in the prior art system of FIG. 1. This limit lies between 2400 and 4800 bits per second, at which point it becomes increasingly impractical to design systems which can provide adequate simulcast transmissions. Historically, the next step to resolving the data rate transmission problem has been by adding additional channels to the system at both the central station and each remote station. Prior art systems utilized an equal number of transmitters at both the central station and the remote stations, and when additional capacity was required, additional transmitters operating on new channels were provided, assuming such frequency spectrum allocation was available, at the central station and at each remote station. Such a solution added both a significant cost and complexity to the system. Furthermore, such systems, in actuality provided excess capacity which was not adequately being utilized, in order to guarantee message through-put and message delivery.

SUMMARY OF THE INVENTION

A method for transmitting addresses and messages in a multiple transmitter wide area communication system is described. The system comprises a central station having an acknowledge back receiver and a plurality of transmitters each transmitting on an individual channel. The system further comprises a plurality of remote stations each having an acknowledge back receiver which is capable of selectively receiving on each of the individual channels, and a transmitter which is capable of selectively transmitting on each of the individual channels. The central and remote stations provide for the transmission of addresses and messages to a plurality of acknowledge back pagers assigned to operate on the individual channels. In operation, each central station transmitter substantially simultaneously transmits on each individual channel at a high data bit rate all addresses for the acknowledge back pagers for which messages are intended, and then transmits the messages intended only for those acknowledge back pagers which responded with an acknowledge back signal at the same data bit rate. The central station then transmits on a preselected channel to the remote stations the addresses and messages of only those acknowledge back pagers failing to respond to the previous address transmissions originated from the central station. Whereupon, the remote stations simulcast transmit at a low data bit rate on each of the channels in a predetermined sequence, the addresses of those acknowledge back pagers which failed to respond to the addresses transmitted from the central station. The remote stations then transmit at the high data bit rate the messages intended for those acknowledge back pagers which responded with an acknowledge back signal. Since the volume of messages handled by the remote stations are considerably less than handled by the central station transmitters, only a single synthesized transmitter is required at the remote station, reducing the overall number of transmitters required to provide a multiple transmitter wide area communication system.

It is an object of the present invention to provide a multiple transmitter wide area communication system requiring fewer transmitters than conventional multiple transmitter communication systems.

It is a further object of the present invention to provide a multiple transmitter wide area communication system allowing system growth with only a minimal increase in the number of transmitters required.

It is a further object of the present invention to provide a multiple transmitter wide area communication system providing reduced co-channel interference with other systems operating in adjacent areas.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which; and wherein:

DESCRIPTION OF THE PREFERRED EMBODIMENTS

Figure 1:
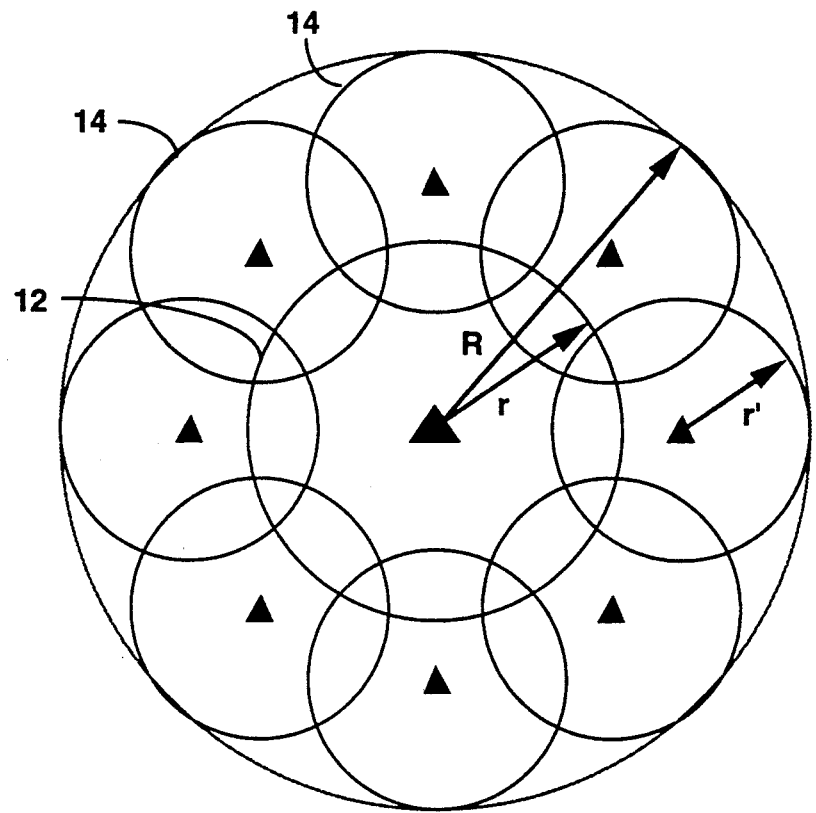
FIG. 1 is diagram of a conventional multiple transmitter wide area communication system.
Figure 1:
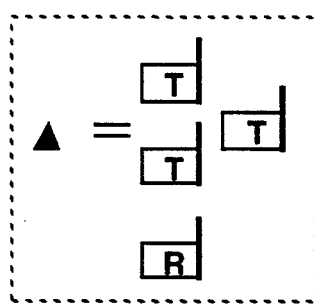
Figure 2:
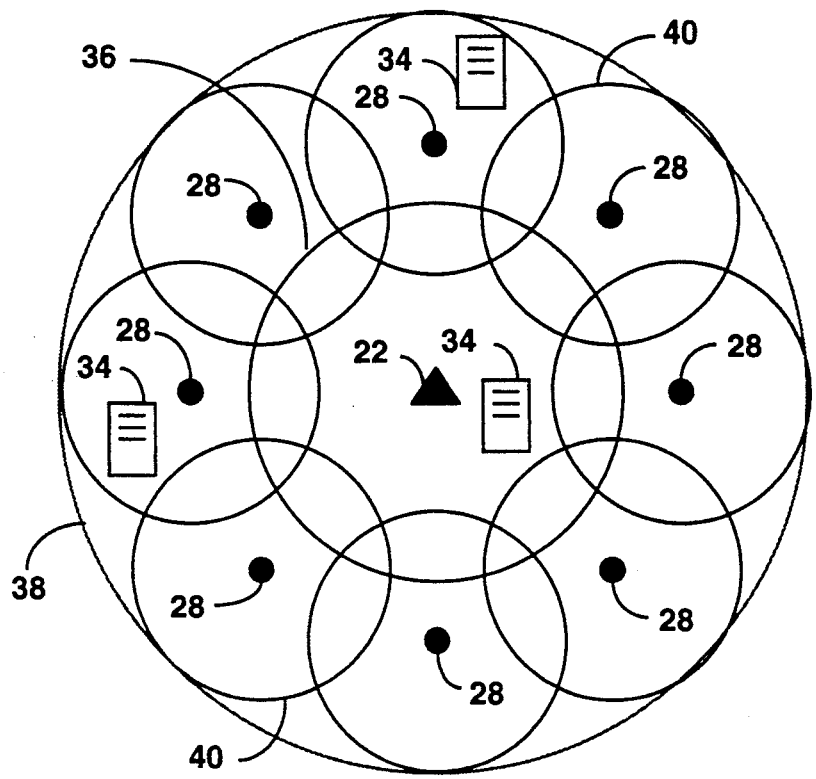
FIG. 2 is a diagram of the multiple transmitter wide area communication system of the present invention.
Figure 2:
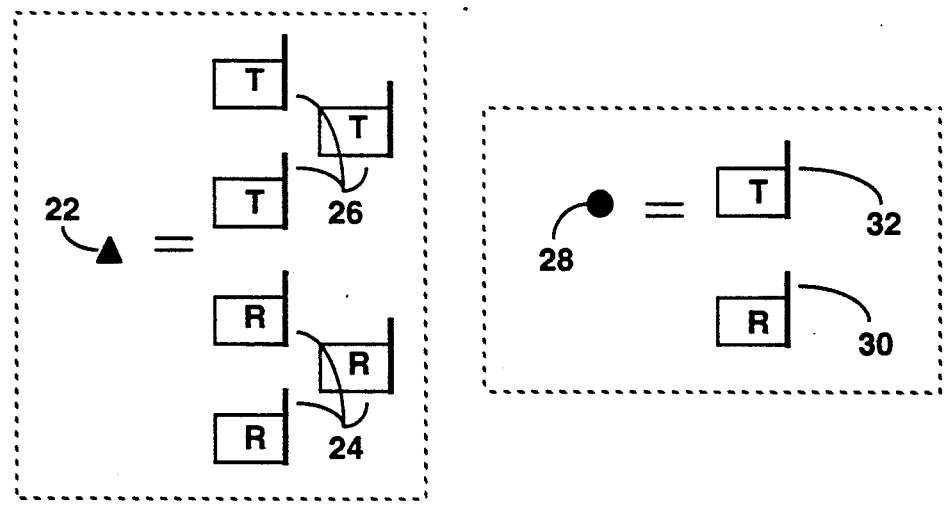

With respect to the figures, FIGS. 2 through 10 illustrate the multiple transmitter wide area communication system of the present invention. As shown in FIG. 2, the multiple transmitter wide area communication system 20 includes a central station 22 comprising a plurality of acknowledge back receivers 24, each operating on one of a plurality of acknowledge back channels, and a plurality of transmitters 26, each transmitting on an individual paging channel. System 20 further comprises a plurality of remote stations 28 each having a single acknowledge back receiver 30 which is capable of selectively receiving on each of the plurality of acknowledge back channels, and a single transmitter 32 which is capable of selectively transmitting on each of the individual paging channels. The central and remote stations provide for the transmission of addresses and associated messages to a plurality of acknowledge back pagers 34, each individually assigned to operate on one of the plurality of paging channels. It will be appreciated, the system being described is typically a large system required to support the multiple transmitter frequencies. In operation, each of the central station transmitters 26 substantially simultaneously transmits on the individual paging channels the addresses for those acknowledge back pagers 34 assigned to each paging channel. The central station transmitters then transmit the messages intended only for those acknowledge back pagers 34 which responded with an acknowledge back response, or signal upon receiving and decoding the transmitted addresses. The acknowledge back responses are monitored at the central station, and as will be described in detail later, may simultaneously be monitored on one or more of the plurality of acknowledge back channels from the remote stations. Within the area bounded by the signal reception contour indicated by circle 36, the central station transmitters provide at least a 90% in-building probability of signal reception, and at least a 98% on-the-street probability of signal reception, similar to that provided by the prior art systems. Within the area bounded by the signal reception contour indicated by circle 38, the central station transmitters provide at least a 60% in-building probability of signal reception, and at least an 90% on-the-street probability of signal reception. Because of the reduced probability of signal reception at this greater distance from the central station, this second area was generally covered by simulcast transmissions from the remote stations in the prior art systems which individually provided at least 90% in-building probability of signal reception, and at least a 98% on-the-street probability of signal reception within a plurality of signal reception contours 40 (two of which are shown), as provided by the central station within signal reception contour 36.

When signaling formats are used which provide both error correction and detection capabilities, the signal reception probabilities approximate the reception probabilities for word detection, such as for addresses and messages. For system 20, operating with a 90% and a 60% probability of signal reception at signal reception contours 36 and 38 respectively, an overall probability of delivering an address from the central station transmitter to the acknowledge back pagers over the total area covered by the central station is approximately 80%, that is 80% of the messages inputted into the system can be delivered directly to in-building acknowledge back pagers from the central station transmitters without the use of the remote station transmitters of the prior art. When 50% of the acknowledge back pagers are assumed to be located on-the-street, and 50% are assumed to be located in-buildings in the area between signal reception contour 36 and signal reception contour 38, the overall probability of address and message reception rises to 90%. Thus, transmissions originating from only the central station, as described, can provide a very high probability of address and message delivery, without the use of the remote stations as provided in the prior art. This is highly desirable for transmitting addresses and messages at high data bit rates, such as 4800 bits per second and higher, as simulcast transmission of the addresses and messages at these data bit rates is impractical due to problems with providing adequate phase compensation between the individual transmitters.

For those addresses and messages which were not originally delivered from the central station on the plurality of paging channels, the addresses and messages can be efficiently delivered from the remote stations using only a single transmitter which is capable of selectively transmitting on each of the plurality of paging channels, as will be described in the following description. The central station transmits the addresses and messages of only those acknowledge back pagers failing to respond to the initial address transmissions from the central station, at a very high data rate, such as 19.2 kilo bits per second and higher, to the remote stations on a dedicated link channel, or on one of the paging channels in a predetermined sequence to be further described with FIGS. 3, 5 and 9. Returning to FIG. 2, by transmitting, as for example, the addresses and messages on a selected one of the paging channels, system costs can be minimized as compared to providing a dedicated link transmitter, as one less transmitter is required at the central station. From the previous description, the number of addresses and associated messages not delivered during the initial address transmissions from the central station amount to between 10%-20% of the messages inputted to the central station. These addresses and messages will be retransmitted from the remote stations for ultimate message delivery in the preferred embodiment of the present invention. As the addresses and messages are transmitted to the remote stations, they are temporarily stored, as will be described shortly, at the remote stations prior to transmission. The remote stations next transmit on the selected one of the individual paging channels the addresses of those acknowledge back pagers which failed to respond to the addresses transmitted from the central station and then transmit the messages intended for those acknowledge back pagers which responded with an acknowledge back signal.

In summary, addresses of all acknowledge back pagers for which messages are intended are initially transmitted from the central station, followed by those messages intended for acknowledge back pagers providing an acknowledge back response. Messages intended for those acknowledge back pagers failing to provide an acknowledge back response are delivered from the remote stations. The remote stations initially simulcast the address at a low data bit rate to locate those acknowledge back pagers previously failing to respond, followed by message transmission at a high data bit rate, once the acknowledge back pagers have been located.

Figure 3A:
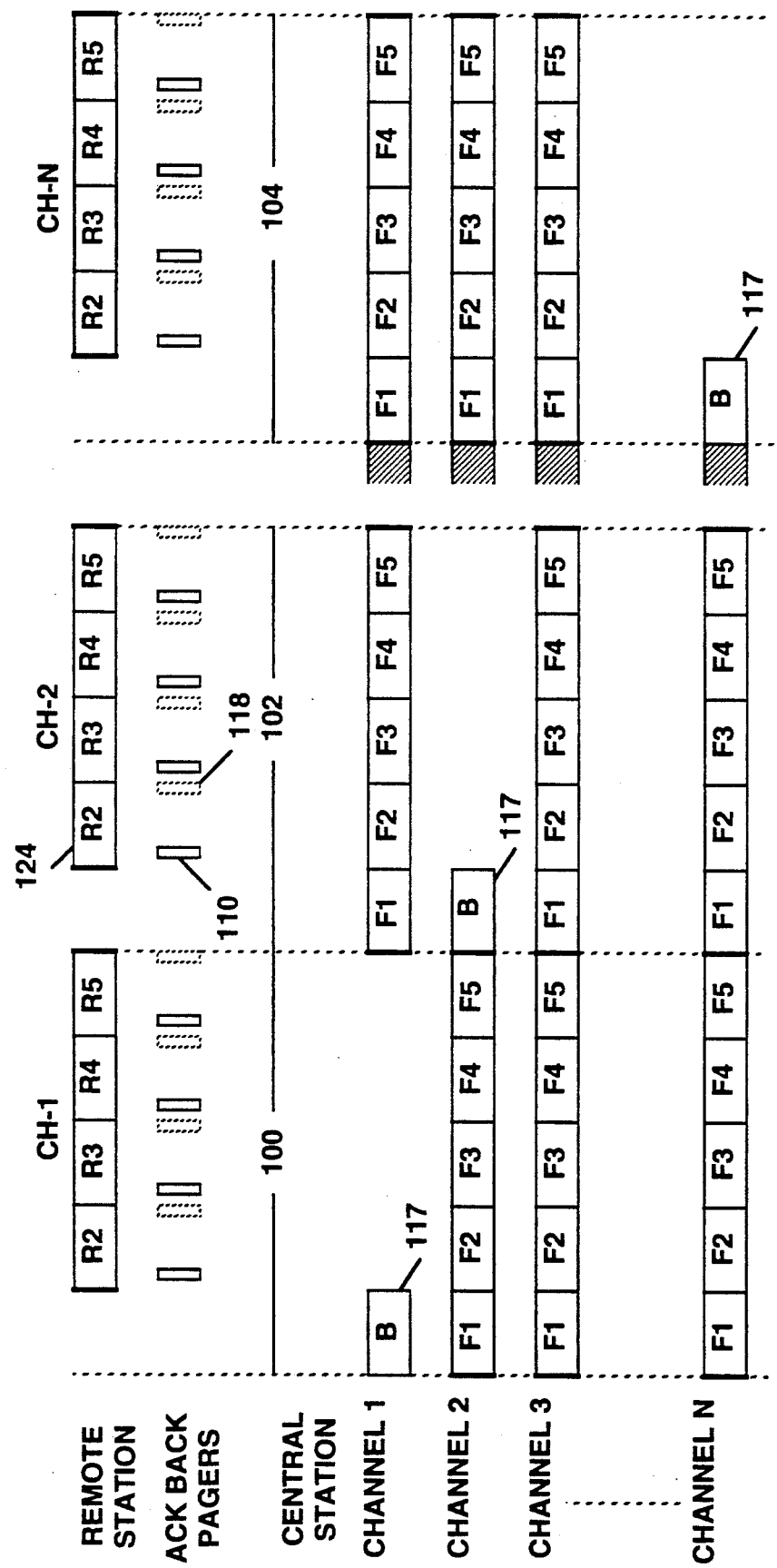
FIG. 3A is a timing diagram showing the operation of the multiple transmitter wide area communication system of the present invention.

FIG. 3A is a timing diagram showing one embodiment of the operation of the multiple transmitter wide area communication system of the present invention. As can be seen in the example provided, the central station utilizes N transmitters operating on N individual, or different paging channels, channel 1 to channel N. It will be appreciated, the actual number of transmitters operating in the system is a function of the number of subscribers requiring service, and the loading present on each channel. The preferred embodiment of the present invention provides the operation described with at least two paging channels assigned to the system. The acknowledge back pagers are each individually assigned to operate on one of the N channels, consequently the N central station transmitters are capable of delivering different address and message information substantially simultaneously on N individual paging channels to the plurality of acknowledge back pagers assigned thereto. In the preferred embodiment of the present invention, transmissions from the central station are delivered during a sequence of predetermined transmission time intervals shown as time intervals 100, 102 and 104. The actual number of transmission time intervals in the sequence can be equal to, less than or greater than, the number of paging channels assigned to the central and remote stations. However, it will be appreciated that the system complexity is minimized when the number of transmission time intervals in the sequence equals, or is a multiple of, the number of paging channels assigned, i.e. N, or 2N transmission time intervals for N assigned paging channels. In the preferred embodiment of the present invention, the number of transmission time intervals in the sequence is equal to the number of paging channels assigned to the central and the remote stations.

Figure 3B:
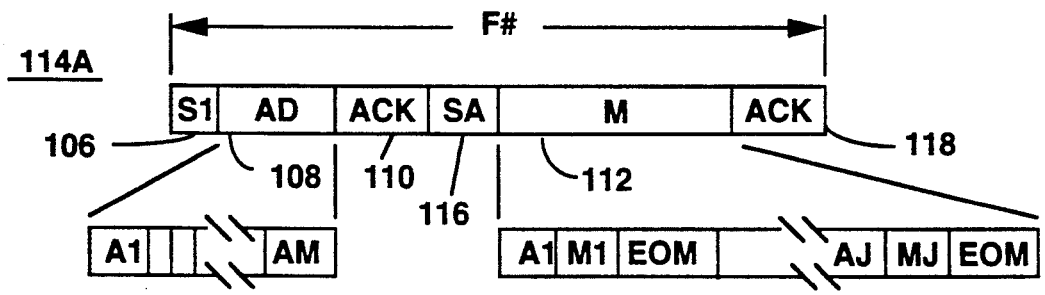
FIGS. 3B–D are timing diagrams showing the format of the addresses and messages transmitted in each transmission time interval by the central and remote stations.
Figure 3C:
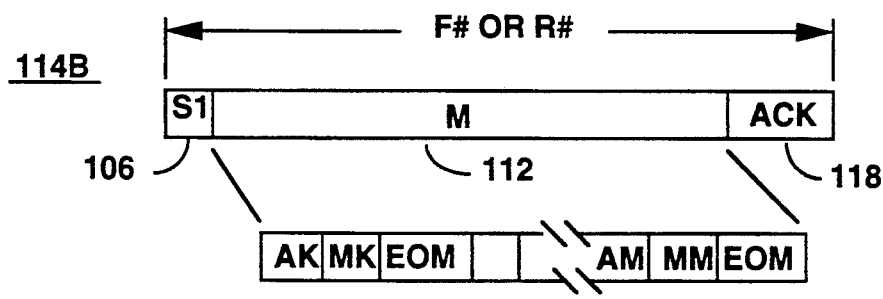
Figure 3D:
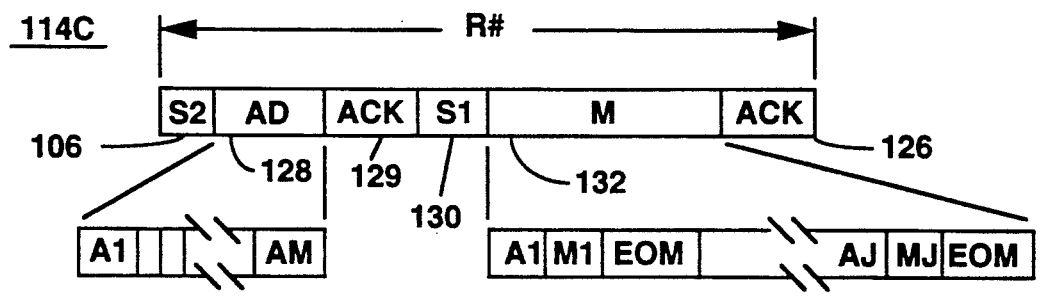

The format of the information transmitted in each transmission time interval by the central station and by the remote stations is shown in FIGS. 3B-3D. As shown, each transmission time interval is configured with a plurality of frames, shown by frame formats 114A (FIG. 3B), 114B (FIG. 3C) and 114C (FIG. 3D). The frames each have a predetermined time duration, such as two seconds, and are numbered as shown by way of example as frames, F1-F5 in FIG. 3A. It will be appreciated that the number of frames transmitted during each transmission time interval may be more or less than described, depending upon the particular transmission requirements of the system.

Information is normally transmitted in a regular frame format, shown as 114A in FIG. 3B, each frame comprising a synchronization codeword 106, an address field 108 including the addresses of the acknowledge back pagers for which messages are intended, and a message field 112 including the messages for those acknowledge back pagers acknowledging address reception. An acknowledge back time interval 110 is provided for the reception of the acknowledge back responses at the central station from those acknowledge back pagers receiving their assigned addresses. A further acknowledge back time interval 118 may be provided for reception of the acknowledge back responses confirming reception of the associated messages transmitted during the message block 112.

In the preferred embodiment of the present invention, the address field 108 provides for the transmission of a plurality of acknowledge back pager addresses, identified as A1-AM of frame format 114A in FIG. 3B. Any of a number of well known address formats, such as the 31,21 BCH codeword utilized in the POCSAG signaling format, may be utilized in for the address field of the present invention. A unique 31,21 BCH codeword is utilized for the synchronization codeword 106. The synchronization codeword and addresses are transmitted at a first data bit rate, which in the preferred embodiment of the present invention is 4800 bits per second. It will be appreciated, that since simulcast transmission is not utilized, data transmission rates may be higher or lower without affecting the operation of the system.

The message field 112 includes a plurality of addresses identified as A1-AJ and the associated messages, identified as M1-MJ of frame format 114A of FIG. 3B. The messages may be formatted in any of a number of well known message formats, such as the 31,21 BCH codeword, utilized in the POCSAG signaling format. Each message in the message field is delimited by an end of message (EOM) codeword, thereby providing the capability for the transmission of variable length messages. When the message content of a particular frame exceeds the capacity of that frame, the message transmission is continued into the next frame, as shown in frame format 114B of FIG. 3C. In the example shown, messages M1-MJ were delivered during the regular frame 114A of FIG. 3B, and messages MK-MM were delivered during the continuation frame 114B FIG. 3C. Separate transmission of the address and the associated message enables transmitting messages only to those acknowledge back pagers acknowledging the initial address transmission. The messages are also transmitted at the first data bit rate, which in the preferred embodiment of the present invention is 4800 bits per second.

A description of the operation of an acknowledge back pager providing acknowledge back response capability suitable for use with the present invention is described in Siwiak U.S. Pat. No. 4,823,123 issued Apr. 18, 1989, entitled "Acknowledge Back Pager with Frequency Control Apparatus", and Siwiak et al. U.S. Pat. No. 4,825,193 issued Apr. 25, 1989, entitled "Acknowledge Back Pager with Adaptive Variable Transmitter Output Power" which are assigned to the assignee of the present invention, and which are hereby incorporated by reference herein. A description of signaling formats suitable for delivering acknowledge back responses from the acknowledge back pagers and suitable for use with the present invention is provided in U.S. Pat. No. 4,875,038 issued Oct. 17, 1989 and entitled "Frequency Division Multiplexed Acknowledge Back Paging System"; and U.S. Pat. No. 4,882,579 issued Nov. 21, 1989 and entitled "Code Division Multiplexed Acknowledge Back Paging System", both of which are assigned to the assignee of the present invention, and which are hereby incorporated by reference herein.

Returning to FIG. 3A, in the preferred embodiment of the present invention, any number of addresses and associated messages may be delivered during a frame. By way of example, when addresses are transmitted in the frame, it is anticipated from the previous description of signal reception probabilities, that on the average, 80% of the transmitted addresses, or sixteen addresses will be received by the intended acknowledge back pager when in-building signal reception probabilities are assumed, and 90% of the transmitted addresses, or eighteen addresses will be received by the intended acknowledge back pagers when equal in-building and on-the-street signal reception probabilities are assumed. When five 20 address frames are transmitted during a particular transmission time interval, it is anticipated between ten and twenty acknowledge back pagers will fail to respond to the address transmission by the central station on each of the paging channels, while eighty to ninety acknowledge back pagers will respond on each of the paging channels. It will be appreciated the estimates of acknowledge back responses may be higher or lower than indicated depending upon many well known factors affecting signal reception in the system described.

During acknowledge back time interval 110 of FIG. 3B, the acknowledge back responses are received from the acknowledge back pagers on the appropriate acknowledge back channel at the central station. It will be appreciated, that depending on the location of the central station, multiple acknowledge back receivers may be required within the system to provide an acknowledge back response reception reliability to be equal to or greater than the signal reception probability of the acknowledge back pagers. In general, the system design of the present invention is such that the reliability of receiving the acknowledge back responses from the acknowledge back pagers is greater than the signal reception probability. In the example provided above, sixteen to eighteen acknowledge back responses would be received at the central station on each paging channel during each regular transmission frame having twenty addresses. The messages associated with these addresses for which acknowledge back responses are received are next transmitted during the message field 112 as previously described. The addresses and messages for acknowledge back pagers not acknowledging addresses reception at the central station are accumulated and stored in memory in the central station in relationship to the assigned paging channel for processing at a later time, to be described shortly.

When each remote station is configured with acknowledge back receivers on each acknowledge back channel, for reception of the acknowledge back responses, the acknowledge back responses are accumulated and stored in memories at each of the remote stations. As shown in FIG. 3A, acknowledge back responses are simultaneously accumulated for up to N−1 different frequencies, or paging channels during each transmission time interval. During the next, or subsequent, transmission time interval, in this example during transmission time interval 102, the remote stations transmit the accumulated acknowledge back response information back to the central station during the system acknowledgement time interval (SA) 116, on the Ith paging channel, i.e. the one paging channel not actively transmitting addresses and messages. The Ith paging channel is hereinafter defined as that paging channel which is not a part of each group of N−1 transmitters transmitting substantially simultaneously from the central station during a particular transmission time interval. Consequently, the Ith paging channel may be channel 1 in the first transmission time interval, and channel N in the Nth transmission time interval. The acknowledge back response information from the remote stations is processed at the central station to identify the remote stations nearest to the acknowledge back pagers acknowledging address reception, the purpose of which will be described in detail shortly.

The addresses and messages which have been accumulated from acknowledge back pagers failing to acknowledge address reception, are processed at the central station and then transmitted on the Ith channel, from the central station to the remote stations during the burst time interval 117 of FIG. 3A. Burst time interval 117 corresponds to a time interval approximately equal to one frame time interval. As previously described this information is transmitted at a very high bit rate, such as 19.2K bits per second. The transmission rate is determined by the volume of addresses and messages for those acknowledge back pagers failing to respond during the previous transmission time intervals which must be transmitted during the burst time interval. During the four frames following the burst transmission, the addresses 124 and messages 124 are transmitted from the remote stations. The data transmitted during the burst time interval includes addresses and messages for those acknowledge back pagers which initially failed to respond. The burst data may also include information identifying the closest remote station for each acknowledge back pager.

During the burst on the Ith Channel, only addresses of the acknowledge back pagers assigned to the Ith channel, which failed to respond to the initial address transmission from the central station, are burst out to the remote stations during the Ith paging channel. Information on the other N−1 paging channels continues to be accumulated at the central station until each paging channel becomes the Ith channel in the sequence. Since the Ith channel sequences between all paging channels during each N transmission time intervals, in this manner all addresses and messages can be burst to the remote stations without any channel identification during the complete sequence of transmission timer intervals.

The addresses are simulcast from all the remote stations, during the address transmission interval 128 on the Ith channel, as shown in frame format 114C of FIG. 3B. As previously indicated transmissions of the addresses and the messages from the central station occurred at a first data bit rate, such as 4800 bits per second. The address transmission from the remote stations, during the the address block 128 of frame 114C, shown in FIG. 3B, is transmitted at a second, lower data bit rate, such as 1200 bits per second. These addresses may also be simulcast from the central station at the second data bit rate to increase the probability of reception within the system, although this is not absolutely necessary.

Following the acknowledge back responses during time response interval 129 of frame format 114C of FIG. 3D, the remote stations then transmit a second synchronization signal 130 at the first data bit rate, followed by transmission of the message block 132. The message block 112 includes the acknowledge back pager address, followed by the associated message and an end of message marker, all transmitted at the first data bit rate. The transmission of the second synchronization signal 130 at the first data bit rate allows the acknowledge back pager to resynchronize to the higher data bit rate used for message transmission.

During time interval 110 of FIG. 3A, the acknowledge back pagers respond to the address transmissions from the remote stations. The messages are then transmitted on the Ith channel at the first higher data bit rate from selected ones of the remote stations during each frame identified as R2-R5 during time interval 124. In the example shown, the particular transmission occurs on paging channel 2 of the N paging channels. The messages are transmitted from selected remote stations to allow interference free high speed message transmission.

Figure 4:
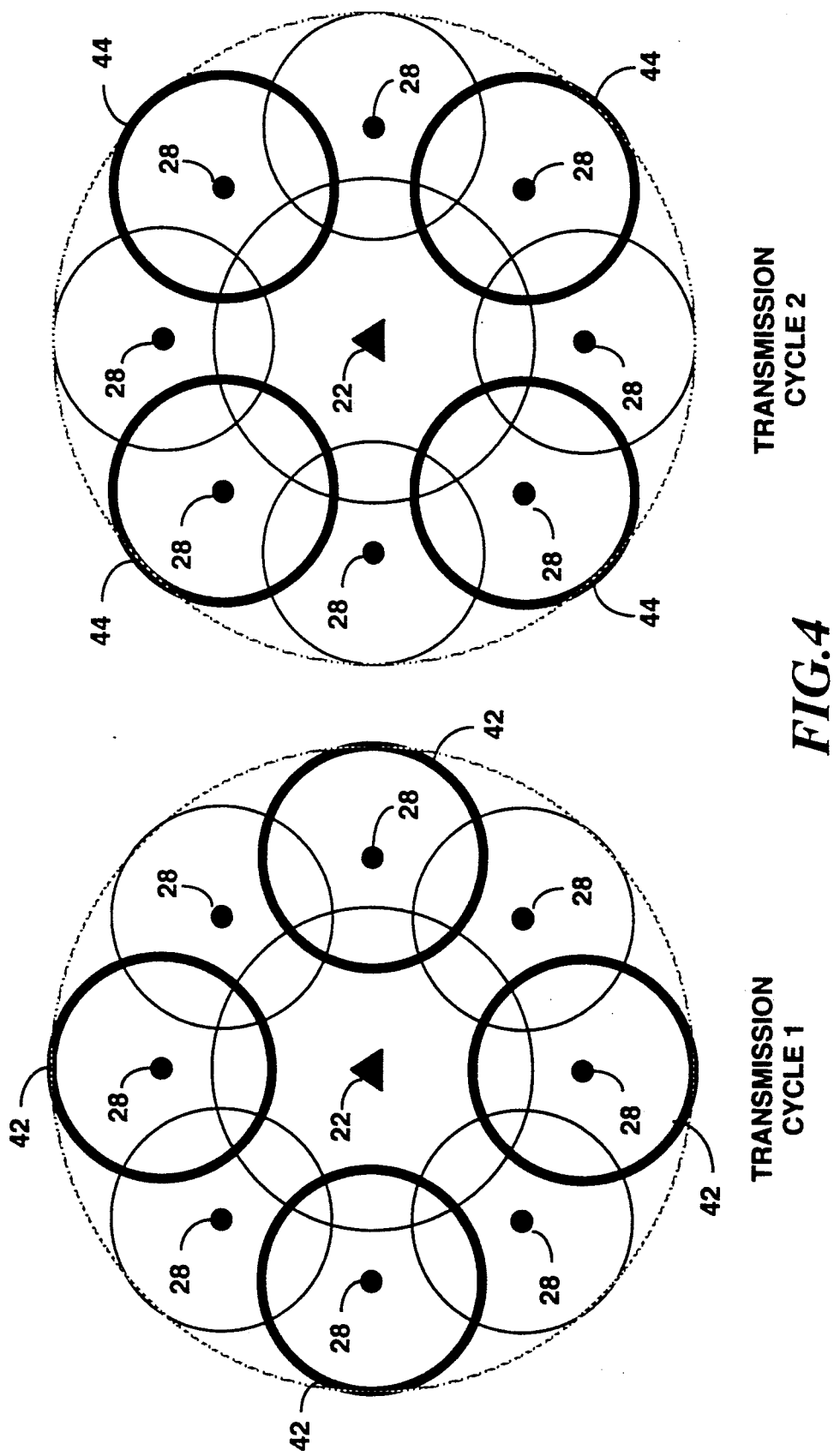
FIG. 4 is a plan drawing of the multiple transmitter wide area communication system illustrating the operation of the remote stations in the preferred embodiment of the present invention.

One selection method suitable for providing interference free transmissions from the remote stations is to first transmit from one set of alternate, non-overlapping cells 42, and then transmit from a second set of alternate non-overlapping cells 44, as shown in FIG. 4. The group of transmitters operating simultaneously are shown by the heavy circles. This allows the high speed message transmission to be effected without the problems normally associated with simulcast transmissions at the high data bit rates. When information is provided locating each acknowledge back pager, the messages are transmitted only from the appropriate remote station while the remote station transmissions are being sequenced as previously described.

In summary, during any one transmission time interval, such as during transmission time interval 100 of FIG. 3A, N−1 transmitters are assigned to operate in one of N predetermined transmitter groups, which in this case includes transmitters operating on channels 2 to channel N for the transmission of address and the associated messages from the central station. The Ith paging channel, or transmitter, in this instance is operating on paging channel 1, is used for communication between the remote stations and the central station during system acknowledge time interval 116, and between the central station and the remote stations, during the burst time interval 118. The Ith channel is also used for low data bit rate simulcast address transmissions from the remote stations to the acknowledge back pagers failing to acknowledge the initial high speed transmission from the central station, and for high speed address and message transmission.

Figure 5:
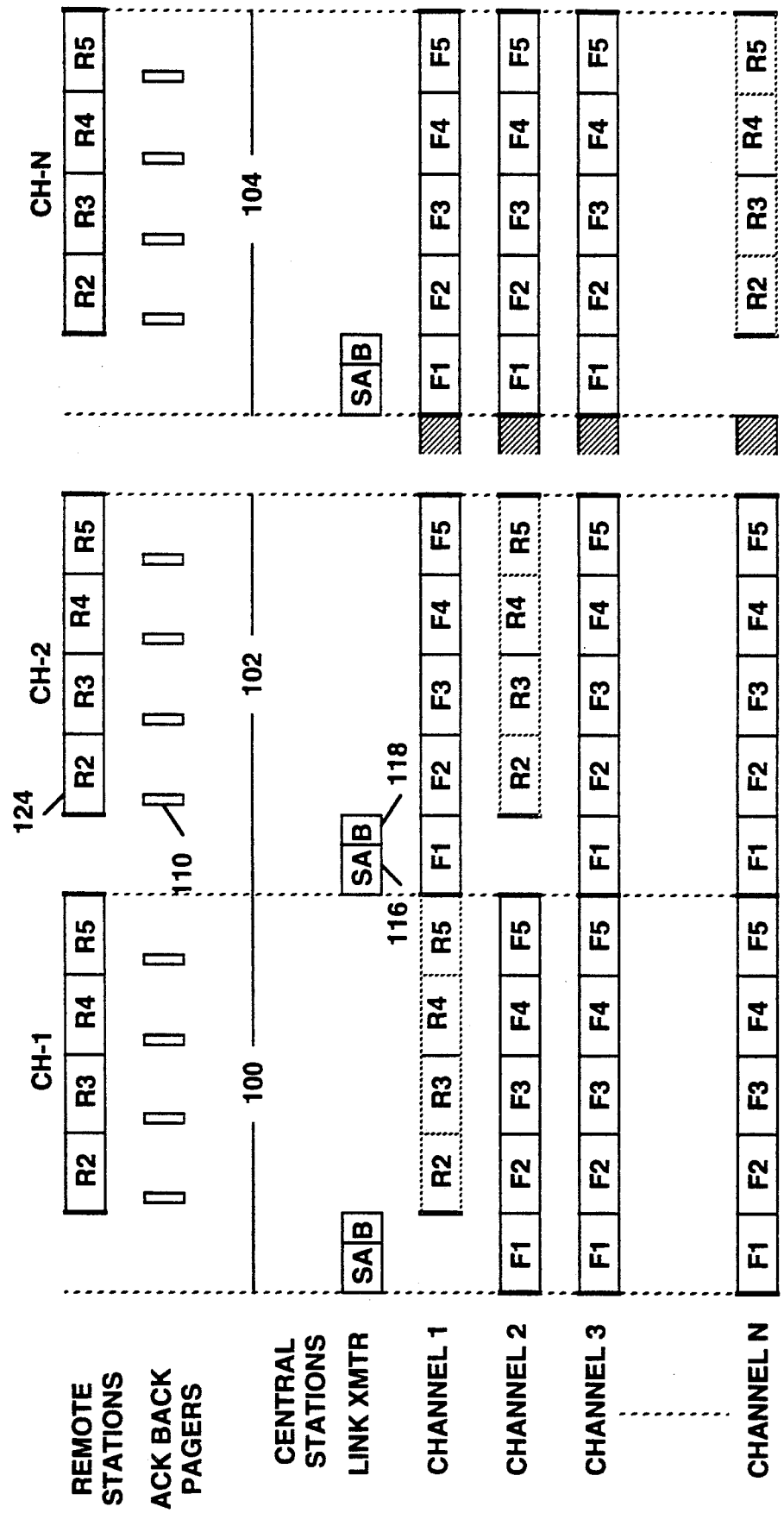
FIG. 5 is a timing diagram showing an alternate operation of the multiple transmitter wide area communication system of the present invention.

FIG. 5 is a timing diagram showing an alternate method of operation of the multiple transmitter wide area communication system of the present invention. The wide area communication system operating as shown in FIG. 5 utilizes link transmitters and receivers on a dedicated channel separate from the paging channels assigned for address and message transmission. This is advantageous to provide communication between the central station and the remote stations which is independent of the paging channels to provide very high speed communication between the central station and the remote stations. Operation on the paging channels is the same as described for FIG. 3.

Figure 6:
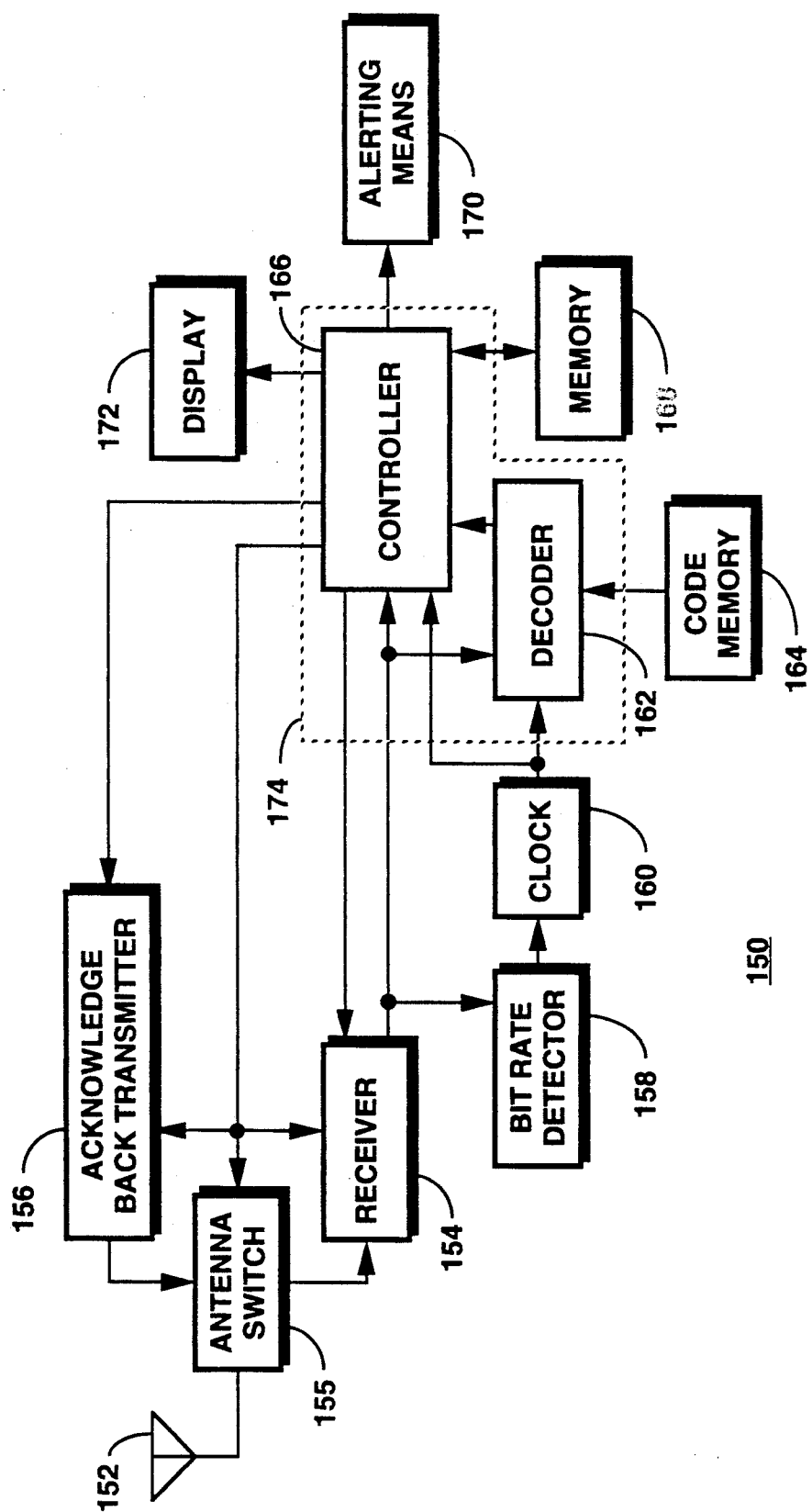
FIG. 6 is an electrical block diagram of an acknowledge back paging receiver utilized in the multiple transmitter wide area communication system of the present invention.

FIG. 6 is an electrical block diagram of an acknowledge back pager utilized in the multiple transmitter wide area communication system of the present invention. Aspects of the acknowledge back pager suitable for use in the wide area communication system of the present invention is described in detail in Siwiak U.S. Pat. Nos. 4,823,123 and Siwiak et al. 4,825,193. Only a brief description of the operation of the acknowledge back pager pertaining to the present invention will be presented herein with reference to FIG. 6. Acknowledge back pager 150 comprises an antenna 152 which couples through antenna switch 155 to a receiver section 154 for receiving transmitted addresses and the associated messages. Antenna 152 also couples through antenna switch 155 to acknowledge back transmitter 156 for transmitting acknowledge back responses. Receiver 154 is an FM receiver, tuned for operation on one of the plurality of paging channels used in the system, and capable of receiving and detecting a suitable modulation for the high speed transmission of addresses and the associated messages. For low bit rate transmissions, frequency shift keyed (FSK) FM modulation is suitable for address and message transmission. For higher bit rate transmissions other FM modulation methods, such as a multilevel FM modulation method is utilized. It will be appreciated that other types of modulation may be employed depending upon the particular data bit rate employed for the transmission of addresses and messages.

The output of receiver 154 is a stream of binary information representing the transmitted addresses and messages. The output of receiver 154 couples to bit rate detector 158 which is used to detect the data bit rate of the received addresses and messages. This is achieved by detecting the bit rate of the one-zero pattern transmitted as the synchronization signal or codeword. The output of bit rate detector 158 couples to clock 160, controlling the clock output frequency. Clock 160 provides a reference frequency which establishes the bit rate at which decoder 162 decodes the received addresses and messages. Clock 160 also provides the reference frequency to controller 166. Consequently, by detecting the bit rate of the synchronization signal, the bit rate at which decoder 162 decodes can be varied. Such bit rate detection and control of decoding bit rates is well known in the art.

Code memory 164 couples to decoder 162, storing predetermined addresses to which the acknowledge back pager is assigned. Multiple addresses may be assigned and stored in code memory 164. The output of receiver 154 is coupled to the input of decoder 162 providing the stream of binary information which is processed by decoder 162. When one of the received addresses matches one of the addresses assigned to the acknowledge back pager and stored in code memory 164, decoder 162 produces and output which couples to controller 166. Controller 166 includes one output coupled to the receiver 154 antenna switch 155, and to the acknowledge back transmitter 156, controlling their operation. When an address has been detected, controller 166 enables acknowledge back transmitter 156 for the transmission of an acknowledge back response to the central station. Controller 166 then disables acknowledge back transmitter 156 and enables receiver 154 for the reception of the subsequently transmitted message information. The message information associated with the acknowledge back pager's addresses, when received is stored in memory 168 by controller 166. The user is then alerted of the received message via alerting means 170. Alerting means 170 provides any of a number of sensible alerts, such as audible, tactile or visual to inform the user the message has been received. The received message is then displayed on display 172 for presentation to the user. It will be appreciated, the functions performed by decoder 162 and controller 166 can be performed by a microcomputer 174, in a manner well known in the art.

Figure 7A:
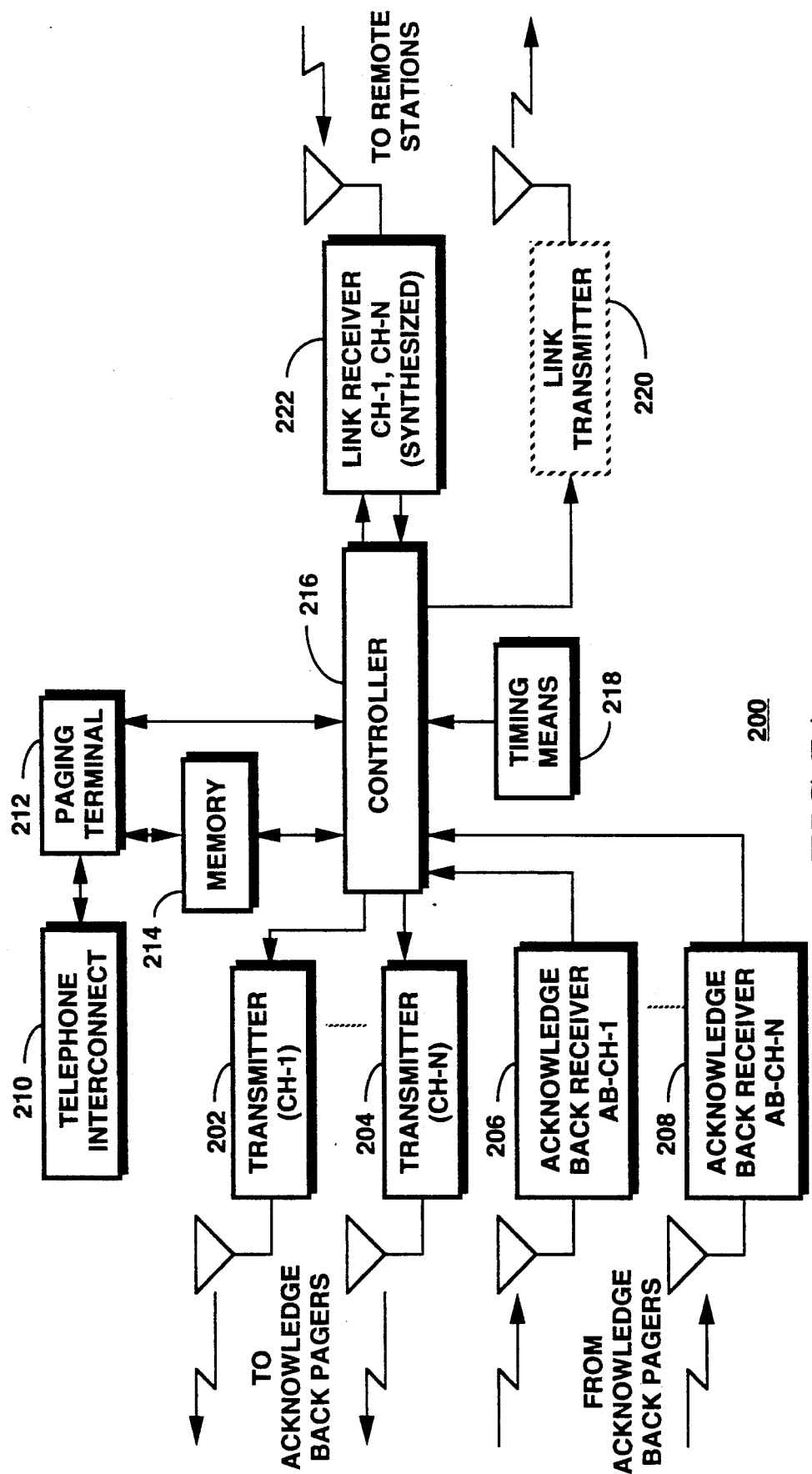
FIG. 7A is an electrical block diagram of the central station utilized in the multiple transmitter wide area communication system of the present invention.

FIG. 7A is an electrical block diagram of the central station utilized in the multiple transmitter wide area communication system of the present invention. Central station 200 comprises N central station transmitters 202-204 for transmitting the addresses and associated messages intended for the plurality of acknowledge back pagers operating in the system. Each of the N central station transmitters is assigned to a different, or individual, paging channel (CH−1, CH−N). As previously described, the central station transmitters 202-204 transmit the addresses and the associated messages in predetermined transmitter groups of N−1 transmitters during a sequence of predetermined transmission time intervals. The addresses and associated messages of acknowledge back pagers failing to acknowledge address reception from the central station are transmitted on the Ith channel, as previously described. The addresses and associated messages of acknowledge back pagers failing to respond are accumulated by the central station during previous transmission time intervals. Transmitters 202-204 are conventionally FM modulated transmitters which are well known in the art.

The central station 200 also includes N acknowledge back receivers 206-208, each operating on a different acknowledge back channel (AB CH1-AB CHN), for receiving the acknowledge back responses from the acknowledge back pagers assigned to each of the acknowledge back channels. Acknowledge back receivers 206-208 provide very narrow intermediate frequency (IF) bandwidths to increase the sensitivity of reception of the acknowledge back responses from the acknowledge back pagers. The acknowledge back responses are transmitted at very low data bit rates, such as 100 bits per second, to compensate for the low power output of each of the acknowledge back pagers. Narrow bandwidth receivers for very low data bit rate reception are well known in the art.

Messages are entered into central station 200 using conventional entry methods common to paging systems, which are well known in the art. The most common method of message entry is through the use of a telephone which allows entry of numeric messages. Alphanumeric messages are generally handled with the use of a data entry device, which may be interconnected to the telephone network. Voice messages may also be handled when suitably digitized at the paging terminal 212 for transmission. Central station 200 includes an input means, such as telephone interconnect 210 for inputting messages. The output of telephone interconnect 210 couples to paging terminal 212. Paging terminal 212 generates the addresses associated with the acknowledge back pager to which the inputted messages are intended. Paging terminals suitable for use in the present invention are well known in the art. Paging terminal 212 provides an output to a controller means, such as controller 216, which controls the storing of the address and associated message in a memory means, such as memory 214, prior to transmission. Memory 214 also stores channel information for each address and associated message. Addresses and messages are stored in memory 214 until a sufficient number have been accumulated for transmission, such as intended for twenty acknowledge back pagers, or until a predetermined time period has elapsed, after which the stored addresses and messages are transmitted.

Controller 216 couples to the central station transmitters 202-204 for controlling the transmission of the stored acknowledge back pager addresses on each of the predetermined transmitter group of N−1 paging channels. Controller 216 is also couples to the central station acknowledge back receivers 206-208, and is responsive to the received acknowledge back responses for controlling the transmission of the associated messages. A timing means 218 is coupled to controller 216 for generating timing signals effecting the generation of the sequence of predetermined transmission time intervals. Timing means 218 also provides the reference frequency for the multiple data rate transmissions. Controller 216, in the preferred embodiment of the present invention is preferably implemented using a microcomuter, such as an MC 6809 microcomputer manufactured by Motorola, or an equivalent.

Controller 216 is further responsive to the failure to receive an acknowledge back response from any of the acknowledge back pagers for effecting the storage of the messages and associated addresses in memory 214. Controller 216 controls the transmission of the stored messages and associated addresses of acknowledge back pagers failing to acknowledge address reception on the Ith channel to the remote station. As previously described, the addresses and messages intended for acknowledge back pagers which fail to acknowledge, may alternately be transmitted on a dedicated channel using link transmitter 220 under control of controller 216. System acknowledge back response are received at the central station by link receiver 222 under the control of controller 216. The system responses are processed by controller 216, and information, such as the remote transmitter closest to a particular acknowledge back pager, is stored with the corresponding address and message in memory 218. When the system acknowledge back responses are transmitted on the Ith paging channel, as previously described, link receiver 222 is preferably implemented using a synthesized receiver which is well known in the art, for reception of the system acknowledge back responses on each of the N paging channels.

Figure 7B:
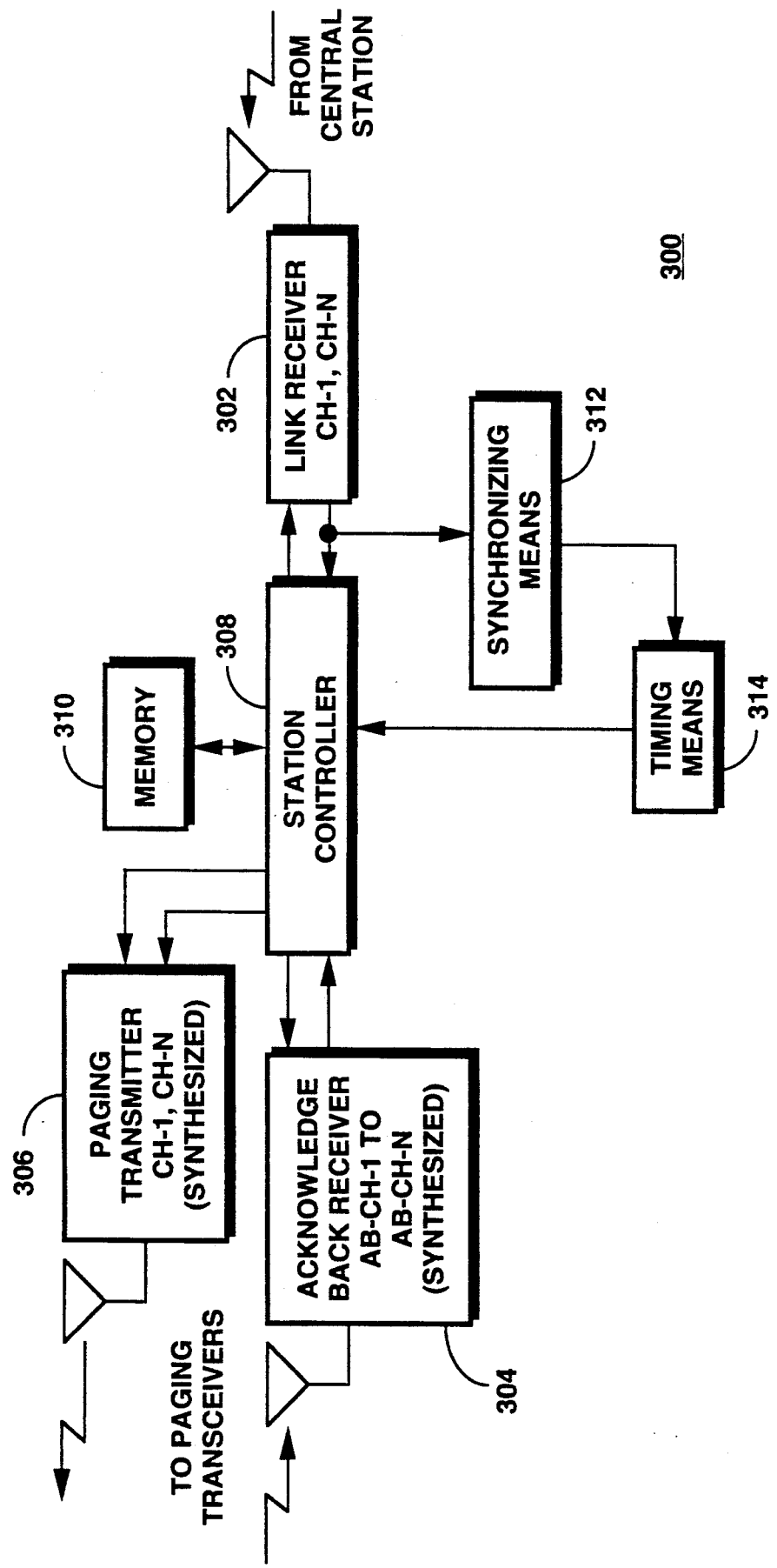
FIG. 7B is an electrical block diagram of a typical remote station utilized in the multiple transmitter wide area communication system of the present invention.

FIG. 7B is an electrical block diagram of a typical remote station utilized in the multiple transmitter wide area communication system of the present invention. Remote station 300 includes a single link receiver 302 which is capable of selectively receiving addresses and messages transmitted from the central station on each of the plurality of paging channels, as during the Ith channel operation, as previously described. Link receiver 302 is preferably implemented using a synthesized receiver which is well known in the art, for reception of the addresses and messages transmitted on each of the N paging channels.

Remote station 300 also includes an acknowledge back receiver 304 for receiving acknowledge back responses from the acknowledge back pagers responding to addresses transmitted by the remote station. Acknowledge back receiver 304 is preferably implemented using a single, synthesized receiver having a narrow IF bandwidth as previously described and which is well known in the art, for reception of the acknowledge back responses on each of the N acknowledge back channels during the corresponding acknowledge back transmission time interval.

Remote station 300 includes a remote station transmitter 306 capable of selectively transmitting addresses and messages on each of the N paging channels. The remote station transmitter 306 transmit the addresses and the messages for the acknowledge back pagers which failed to acknowledge the original address transmission from the central station on each of the N paging channels during the corresponding Ith channel transmission time interval. Remote station transmitter 306 is preferably implemented using a synthesized transmitter which is well known in the art.

The reception of address and messages by the remote stations from the central station is controlled by station controller 308, which stores the addresses and messages in memory 310. Memory 310 also is used to accumulate addresses and messages for those acknowledge back pagers failing to acknowledge address reception from the remote station transmissions.

While not shown in FIG. 7B, the remote stations may be configured to simultaneously receive the acknowledge back responses of the acknowledge back pagers on all N paging channels. In this instance, N acknowledge back receivers are be provided at each remote station to receive the simultaneous acknowledge back responses on the N acknowledge back channels. However, it will be appreciated, such operation is less desirable because of the increased cost and complexity added to each remote station.

Remote station 300 also includes a synchronizing means 312 which couples to the output of link receiver 302, the output of which couples to timing means 314. Timing means 314 provides a timing reference for controller 308 which is used in the generation of the sequence of predetermined transmission time intervals. The remote transmitters are regularly synchronized during each burst transmission from the central station, to provide reliable simulcast address transmissions. Synchronization of the remote stations also insures the transmission time intervals generated at the remote stations correspond to those generated at the central station. Once such method from providing synchronization for simulcast transmission is described in Breeden et al. U.S. Pat. No. 4,718,109 issued Jan. 5, 1989, entitled "Automatic Synchronization System".

Figure 8A:
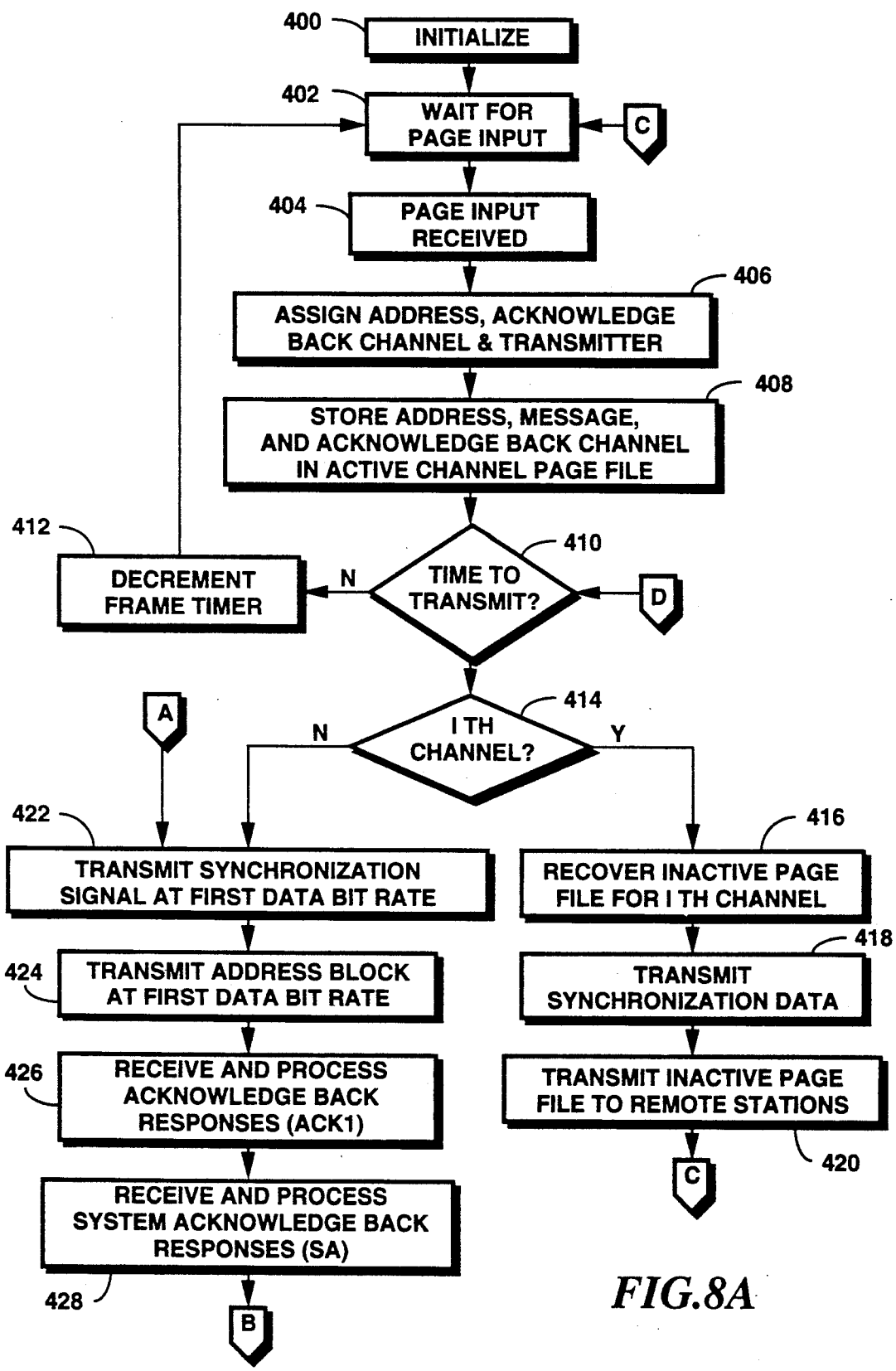
FIGS. 8A and 8B are flow charts illustrating the operation of the central station transmitters in the multiple transmitter wide area communication system of the present invention.
Figure 8B:
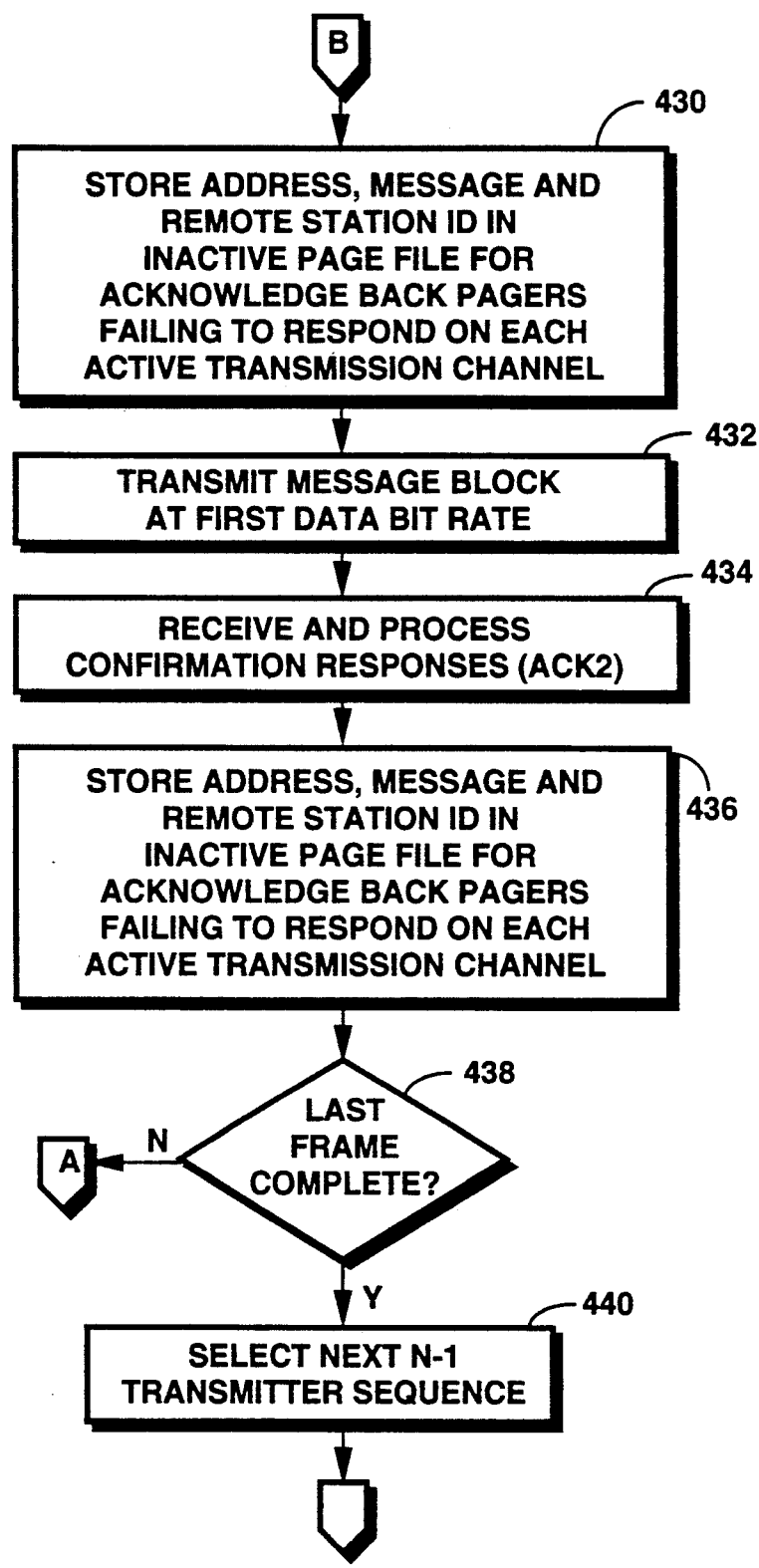
Figure 8C:
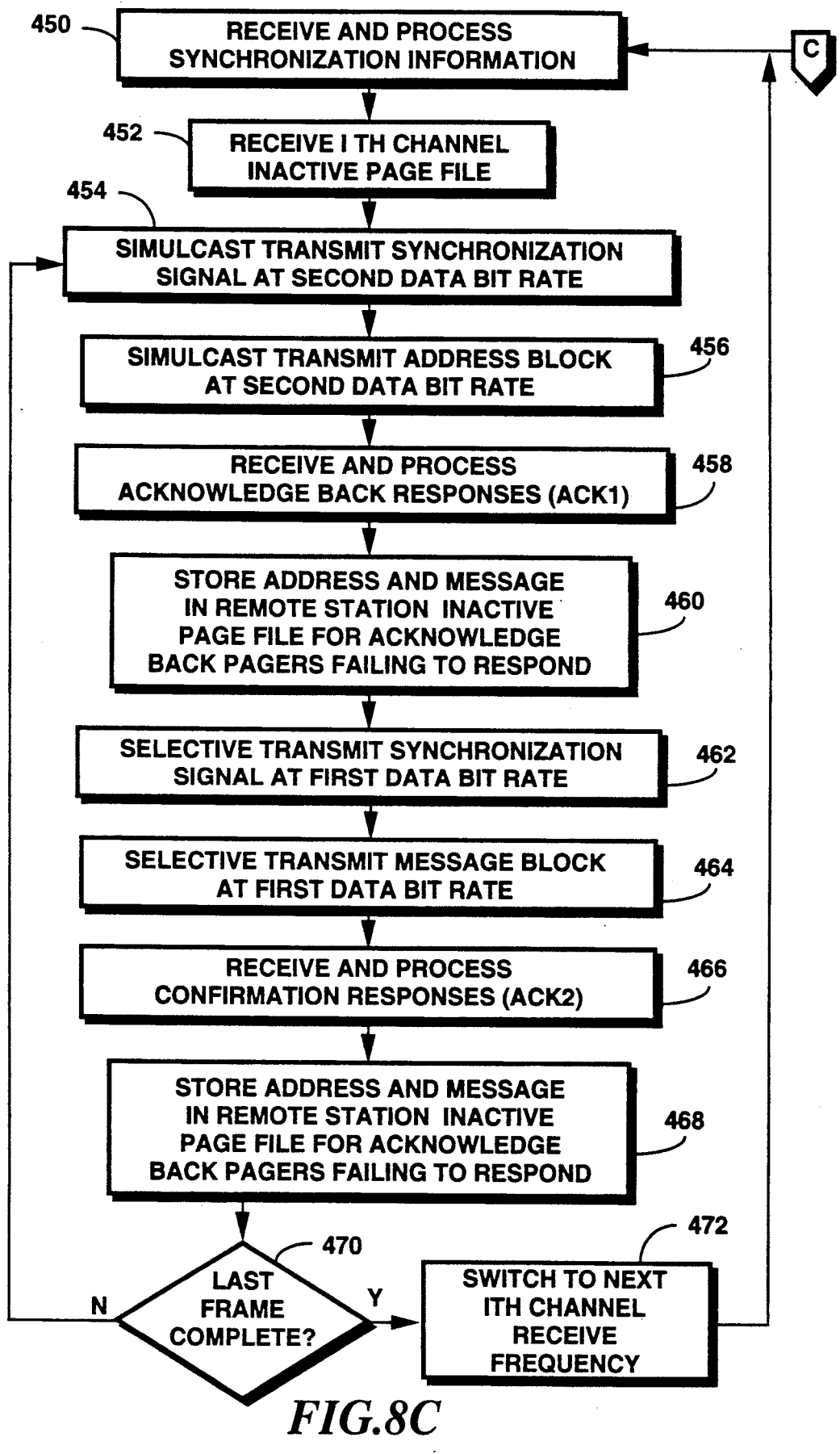
FIG. 8C is a flow chart illustrating the operation of the remote station transmitters in the multiple transmitter wide area communication system of the present invention.

FIG. 8A–C are flow charts illustrating the operation of the multiple transmitter wide area communication system of the present invention. When the system is first turned on, the system is initialized, at block 400. The initialization includes such steps as clearing all message count counters for each of the plurality of paging channels, and setting a counter for controlling the Ith channel operation. During this step, the remote stations are also synchronized with the operation of the central station by periodic transmission of the synchronization information on the Ith channel. The controller waits for page inputs, at block 402, and as the page inputs are received, at block 404, they are processed by the paging terminal to assign the proper acknowledge back pager address, to assign an acknowledge back channel on which each of the acknowledge back pagers will provide acknowledge back responses, and to assign the paging channel, or transmitter, from which the particular message will be delivered, at block 406. The acknowledge back pager address and acknowledge back channel are stored in active page files assigned for each paging channel, at block 408 in the central station memory. The active page files are constructed to provide up to twenty addresses and associated messages to acknowledge back pagers per frame as previously described. The controller next determines when the transmission of the addresses during the first frame of each transmission time interval, at block 410, is to begin. If the transmission start time has not been reached, a frame timer is regularly decremented, at block 412, while additional messages are received, starting at block 402. Once transmissions have started on the system of the present invention, the process of receiving page inputs is continuously occurring, while previously received inputs are being transmitted, as to be described shortly.

When the time to initiate transmissions is detected, at block 410, the controller determines the Ith channel transmitter, at block 414. The controller recovers the inactive page file generated during previous transmissions from the central station, as previously described, for the Ith channel, at block 416. The synchronization data used to synchronize the operation of the remote stations with the central station first is transmitted, at block 418, followed by the transmission of the recovered inactive page file, at block 420. As previously described, if the central station does not participate in the simulcast transmissions on the Ith channel, the Ith channel transmitter at the central station will become inactive until the next transmission time interval, otherwise the Ith channel transmitter will transmit the inactive page file information with the remote stations in a manner to be described shortly.

For the remaining N−1 transmitters, at block 414, each of the N−1 transmitters begins the transmission during the first frame of the transmission time interval by transmitting a synchronization signal at the first data bit rate, at block 422. The synchronization signal transmission allows each acknowledge back pager to obtain bit and word, or frame, synchronization with the data transmission at the data rate at which the subsequent information is transmitted. Following the synchronization signal, the address block is next transmitted at the first data bit rate, at block 424. The controller then waits for the acknowledge back responses generated by the acknowledge back pagers acknowledging receipt of the address transmissions, at block 426. When the remote stations are equipped to also receive the acknowledge back responses on each of the plurality of acknowledge back response channels, the controller also waits for the system acknowledge back responses being generated from each of the remote stations, at block 428. By having a priority assignment of the acknowledge back channels to each of the addresses transmitted during the address block, the controller is capable of determining which acknowledge back pagers failed to acknowledge address reception. The controller process the acknowledge back responses received from the central transmitter acknowledge back response receivers, and received in the system acknowledge back responses, to determine which messages will be transmitted during the subsequent message block. The synchronization codeword and addresses are next transmitted at a first data bit rate. The addresses, messages, and when appropriate, a remote station ID is stored in the inactive page file corresponding to the transmission channel for those acknowledge back pagers failing to respond on each active paging channel, at block 430. A modified message block including those messages for acknowledge back pagers which responded during the previous address transmission are next transmitted at the first data bit rate, at block 432. Since the message reception probability could be lower than the probability for address reception, due to the length of the message transmitted, it will be appreciated, each acknowledge back pager receiving messages can also respond with a confirmation response, at block 434. Such a confirmation response can be processed to determined if the message must be retransmitted to provide reliable message delivery. Depending on the system setup, the message retransmission may be handled from either the central station or the remote stations. When the controller has determined a confirmation response has not been received from a acknowledge back pager having been transmitted a message, the address of the acknowledge back pager, message, station ID where appropriate are stored in the inactive page file for the appropriate paging channel, at block 436, for retransmission at a later time. When the last frame transmission is completed, the controller sets up for the next N−1 transmitter sequence in the next transmission time interval, at block 440, to begin the next transmission sequence during the next transmission time interval, at block 410. The controller then initiates the transmission, at block 410. If the last frame was not transmitted during the transmission time interval, at block 438, the controller returns to block 422 to continue the next frame transmission, as previously described.

The synchronization information transmitted at block 418 of FIG. 8A is received at the remote stations, at block 450 of FIG. 8C, and processed in a manner well known in the art to achieve bit and frame synchronization with the received address and message transmission to follow. The remote station clocks are also synchronized to insure the timing of the transmission time interval transmissions correspond with those generated at the central station. The remote stations were previously synchronized with the central station with respect to the sequencing of the paging channels, during the initialization step, at block 400, of FIG. 8A. After the remote stations receive the inactive page file, at block 452 of FIG. 8C, all remote stations simulcast transmit a synchronization signal at a second data bit rate, at block 454 followed by the address block, at block 456. The remote stations then wait to receive the acknowledge back responses from those acknowledge back pagers for which messages were intended, processing the responses when they are received, at block 458. The addresses and messages for those acknowledge pagers failing to respond to the addresses transmitted from the remote stations, are stored at the remote stations in active page files corresponding to the active pager channel, at block 460. The remote stations then transmit the synchronization information at the first data bit rate, in a sequence, such as described in FIG. 4, thereby allowing high speed address transmission, at block 462, followed by the message block, at block 464. The remote stations then wait to receive the confirmation responses, at block 466, processing the responses to determined if the transmitted messages were received by all acknowledge back pagers for which the messages were intended. Messages for those acknowledge back pagers failing to provide a confirmation responses are stored in the inactive page file corresponding to the active paging channel, at block 468. The remote station controllers verify if messages corresponding to all frames has been transmitted, at block 470. If transmissions for additional frames are indicated, the remote stations begin the message transmission cycle beginning at block 454. When it is determined that messages have been transmitted in all frames, at block 470, the remote station controllers switch to the next Ith channel in the transmission sequence, at block 472, in preparation for receiving the burst from the central station, at block 450.

Figure 9A:
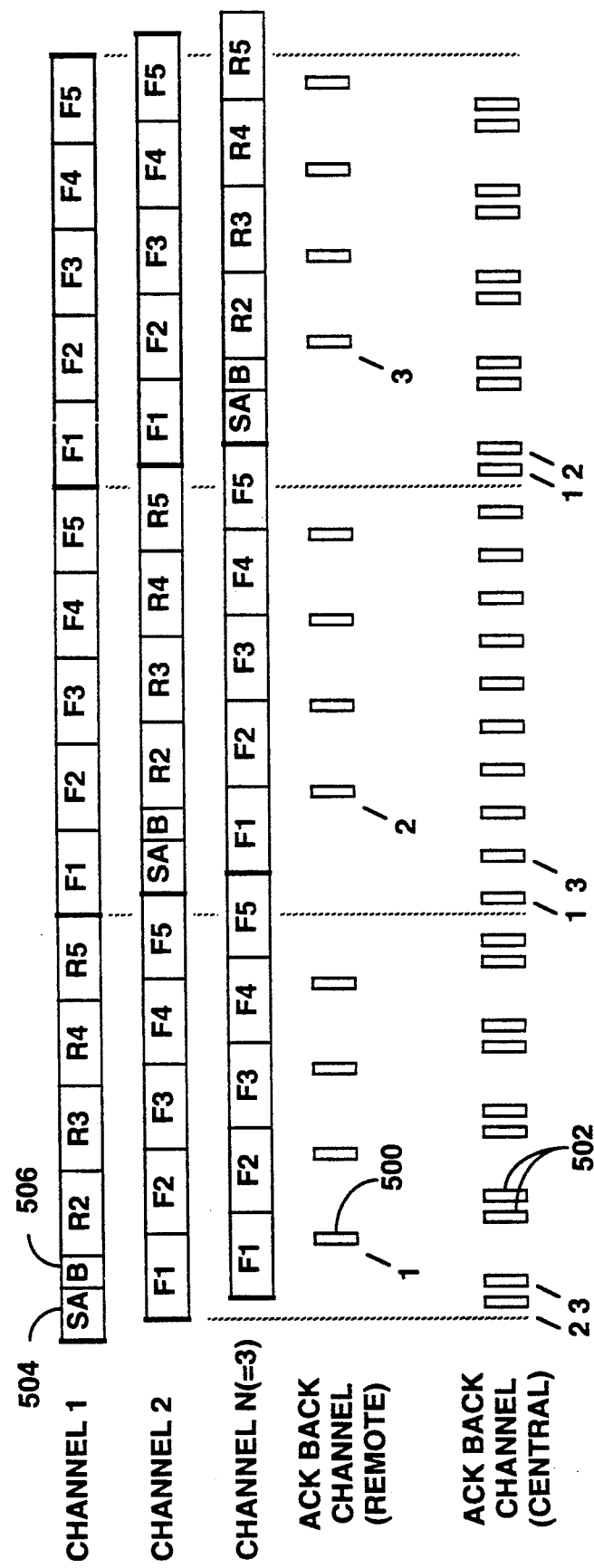
FIG. 9A and 9B are timing diagram showing an alternate embodiment of the operation of the multiple transmitter wide area communication system of the present invention.
Figure 9B:
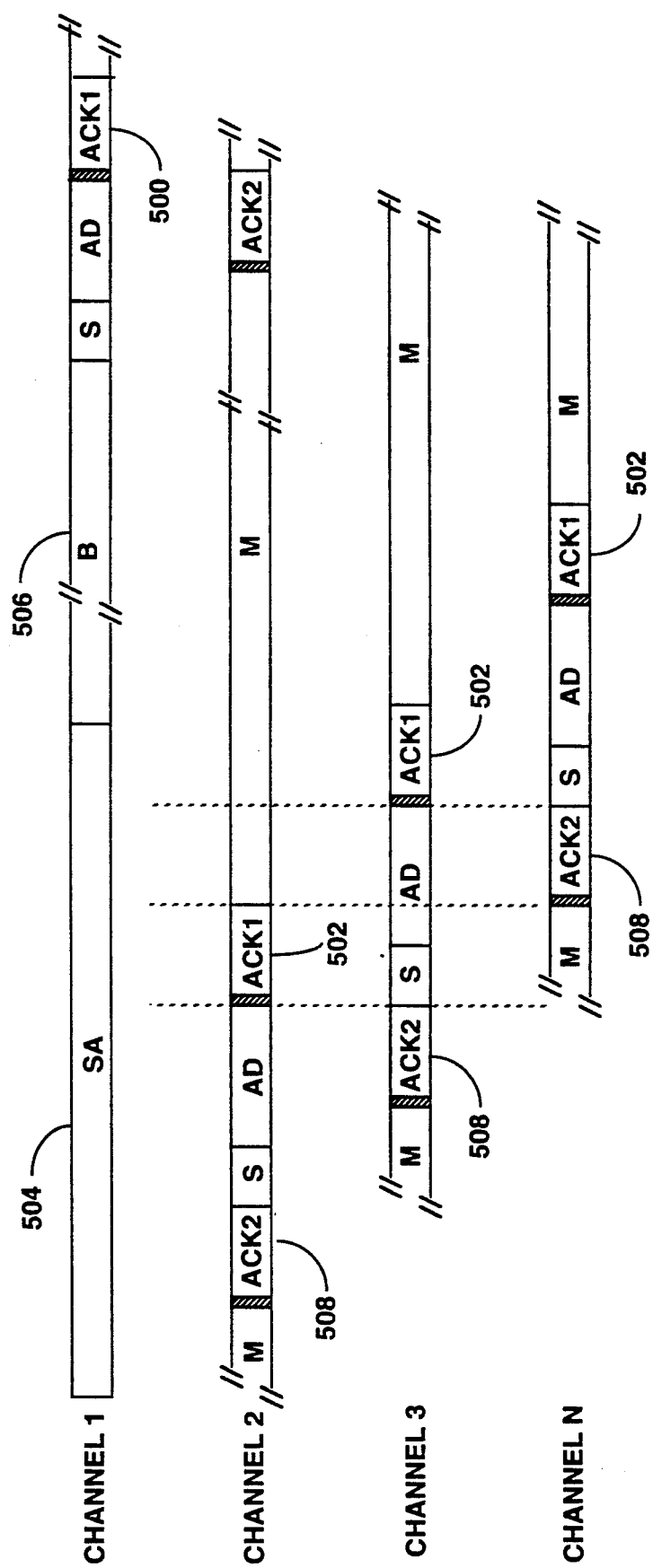

FIGS. 9A and 9B are timing diagrams showing an alternate embodiment of the operation of the multiple transmitter wide area communication system of the present invention. As shown in FIG. 9A, the starting times of the transmission time intervals are offset with respect to each other. The amount of offset in starting times between the transmission time intervals on each channel is selected so as to preclude the simultaneous transmission of acknowledge back responses on any two paging channels. The amount of offset required is shown in more detail in FIG. 9B. As shown in FIG. 9B, the acknowledge back responses on the sequence of paging channels, can readily be offset to preclude the simultaneous transmission of both the acknowledge back responses of those acknowledge back pagers acknowledging address reception on each of the paging channels, as well as the confirmation acknowledge back response on each of the $N-1$ paging channels and the Ith paging channel. The actual length of the offset required is determined by the time required to receive the acknowledge back pager responses 500 on the Ith paging channel and the acknowledge back responses 502 on each of the $N-1$ paging channels. The confirmation acknowledge back responses are not shown in FIG. 9A, although they are shown in FIG. 9B as ACK2, 508. Acknowledge back responses 500 or 502 and 508 require approximately one hundred and fifty milliseconds for transmission plus the time required for the acknowledge back receiver to switch and stabilize in the preferred embodiment of the present invention. The total offset required to preclude the simultaneous transmissions of acknowledge back responses on each paging channel is the sum of the time required to received the basic acknowledge back responses and the confirmation acknowledge back responses, or approximately three hundred and sixty milliseconds. Unlike the operation described in FIG. 3A, this places a limitation on the number of channels which can be operated for a given frame length, such as five paging channels for a two second frame length, or approximately three seconds for an eight paging channel operation. It will be appreciated that the time intervals indicated for acknowledge back transmissions and receiver switching times are by way of example only, and that these times intervals may be greater than or less than that indicated depending upon the particular information provided in the acknowledge back responses, the acknowledge back response transmission bit rate, and the particular receiver characteristics for the acknowledge back receiver being utilized.

In the example shown in FIG. 9A, the acknowledge back responses 500 being transmitted by acknowledge back pagers operating on channel 1 are offset with respect to the acknowledge back responses 502 being transmitted by the acknowledge back pagers operating on channels 2 and 3, as described above and shown in FIG. 9B. This results in a reduction in the number of acknowledge back receivers required at the central station and the remote stations, as compared to the system previously described in accordance with FIG. 3A. Only a single acknowledge back receiver which is capable of selectively receiving the acknowledge back responses on each of the plurality of acknowledge back channels, is required at the central station, and at each remote station, as compared to N acknowledge back receivers, when the start of the transmission time intervals were synchronized.

The transmissions from the central station of addresses and messages on each of the paging channels is identical to that describes for the operation of the system in FIG. 3A. When monitoring of the acknowledge back responses at the remote stations is provided, as previously described, the system acknowledge back responses (SA) 504 are delivered as before, during the first portion of the first frame of each transmission time interval. As previously described, the system acknowledge back responses occur on each channel of the plurality of channels once during each sequence of transmission time intervals, and the acknowledge back responses delivered during the system acknowledge back response time interval include only those responses accumulated for the channel providing the system acknowledge back response. This eliminates the need to transmit channel information, as previously described, and further occurs at a time when no acknowledge back pager responses on that channel are expected.

The burst (B) 506 from the central station to the remote stations occurs during the second portion of the first frame of each transmission time interval on the Ith paging channel, also as previously described.

Figure 10A:
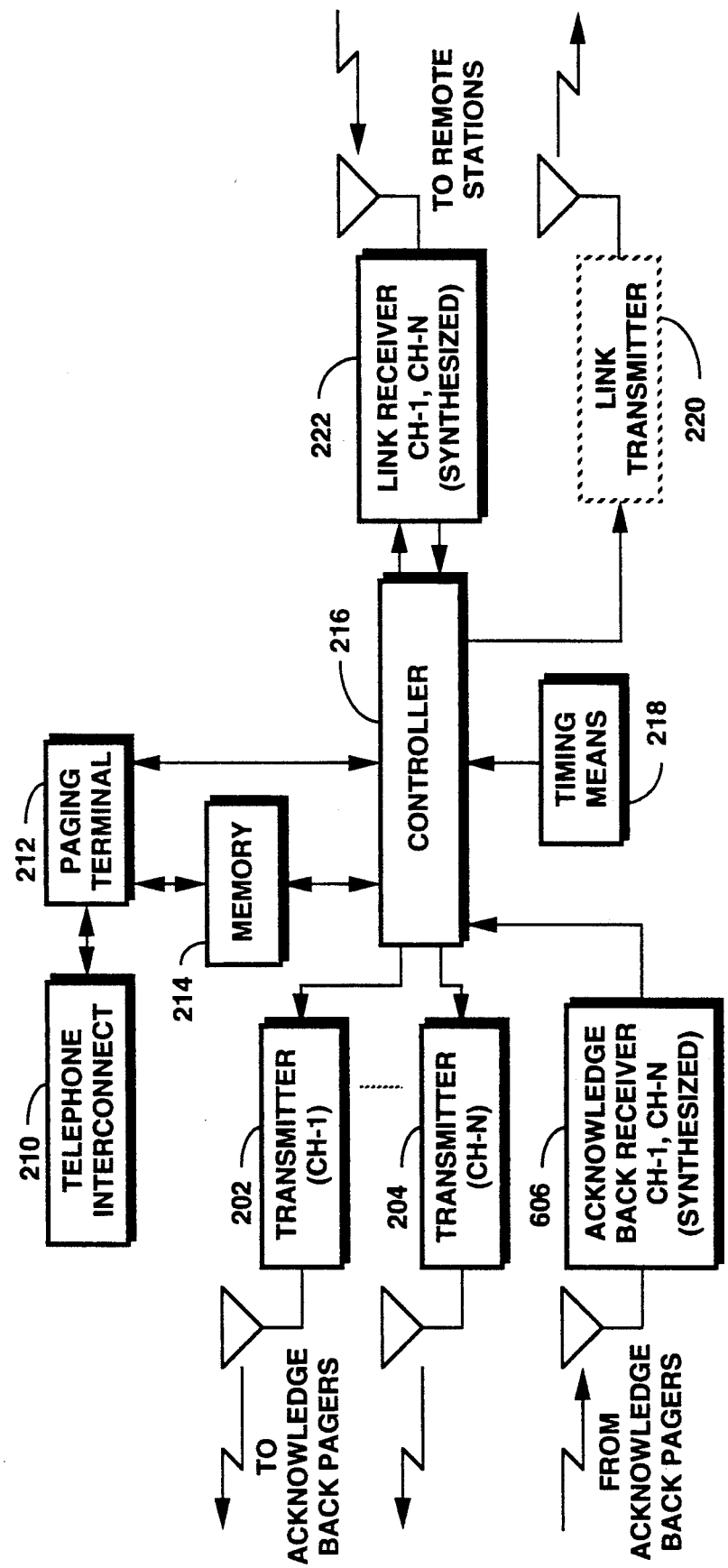
FIG. 10A is an electrical block diagram of an alternate embodiment for the central station utilized in the multiple transmitter wide area communication system of the present invention.

FIG. 10A is an electrical block diagram of the central station utilized in the alternate embodiment of the multiple transmitter wide area communication system of the present invention. The operation of the central station of FIG. 10A is substantially identical to the operation of the central station described in FIG. 7A. However, unlike the central station of FIG. 7A which required N acknowledge back receivers 206-208, the central station of FIG. 10A requires only a single acknowledge back receiver 606 which is capable of selectively receiving the acknowledge back responses on each of the plurality of acknowledge back channels. The control of the synchronization of the start of the transmission time intervals on each of the N paging channels, as well as the offsets in the start of the transmission time intervals on each of the N paging channels is controlled by controller 216. Because the transmission time interval synchronization for all N paging channels is controlled by controller 216, control of the offsets to preclude simultaneous acknowledge back transmissions from the acknowledge back pagers is readily assured.

Figure 10B:
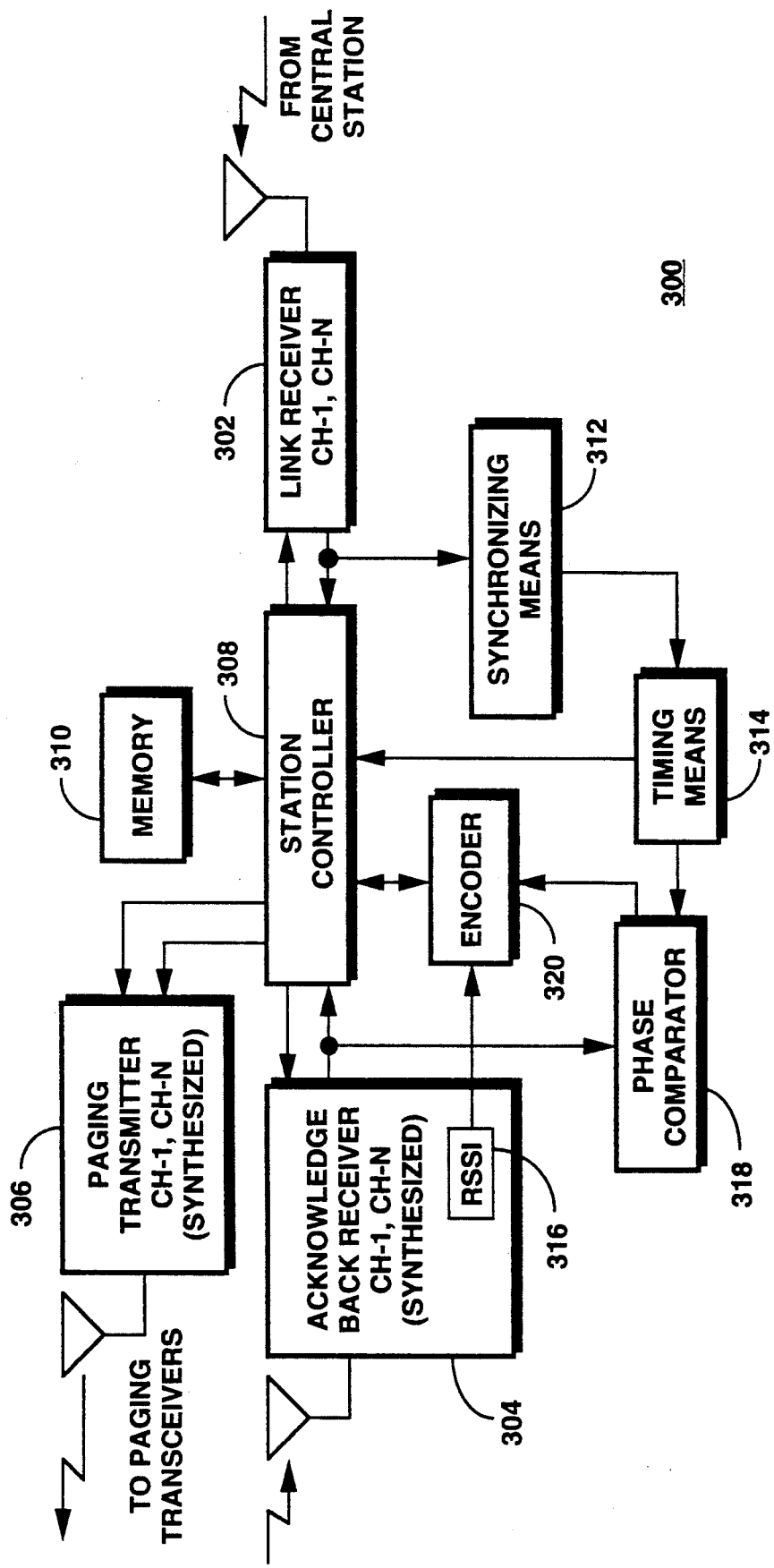
FIG. 10B is an electrical block diagram of an alternate embodiment for a typical remote station utilized in the multiple transmitter wide area communication system of the present invention.

FIG. 10B is an electrical block diagram of a typical remote station utilized in the alternate embodiment of the multiple transmitter wide area communication system of the present invention. The operation of the remote station of FIG. 10B is substantially identical to the operation of the remote station described in FIG. 7B. Unlike the remote station of FIG. 7B, the remote station of FIG. 10B is also capable of monitoring the acknowledge back responses on each of the N acknowledge back channels utilizing a single acknowledge back receiver 304 which is capable of selectively receiving on each of the N channels. Consequently the remote stations of FIG. 10B can be used to receive acknowledge back responses from acknowledge back receivers acknowledging address reception from the central station, as well as for receiving acknowledge back responses from acknowledge back pagers acknowledging address transmission from the remote stations. By providing the ability to monitor the acknowledge back responses on all channels at the remote stations, increased reliability in receiving the acknowledge back responses from transmissions originated at the central station can be provided. This results in a reduction in the number of addresses and messages which would otherwise be transferred to the remote stations for failure of the central station to receive an acknowledge back response from one of the acknowledge back pagers.

The reliability in message delivery can also be increased by providing the capability within the system to determine the location of the responding acknowledge back pager. This can be readily accomplished as shown in FIG. 10B. Each of the acknowledge back receivers located at the remote stations may include a received signal strength indicator, or RSSI 316. The RSSI provides a measurement of the received signal strength from each responding acknowledge back pager at each remote station, on each channel in a manner well known in the art. The output of the RSSI is a binary output representing the magnitude of the received signal strength which is then coupled to encoder 320. Encoder 320 processes the binary magnitude information adding error detection and correction information in a manner well known in the art. In addition a measurement of the differential phase delay of the received acknowledge back responses may be made by phase comparator 318 using timing means 314 as a reference. The output of phase comparator 318 is a binary output representing the differential phase delay of each of the received acknowledge back responses at the remote stations. Encoder 320 processes the binary differential phase delay information adding error detection and correction information. The encoded signal strength magnitude information and differential phase delay information may be transmitted with identification information identifying the responding acknowledge back pagers, during the system acknowledge back response transmissions. This information is processed at the central station together with all of the responses from all remote stations to determined the remote station closest to the responding acknowledge back pagers. When the inactive page file is transferred to the remote stations from the central station the address and message information is flagged identifying the closest remote station, from which the corresponding address and message transmission would then be made during the remote station transmissions on each of the paging channels.

A multiple transmitter wide area communication system has been described herein. All addresses of acknowledge back pagers are initially transmitted from a central station, followed by the messages for those acknowledge back pagers acknowledging address transmission. Addresses and messages of acknowledge back pagers failing to acknowledge address transmission from the central station are forwarded to a plurality of remote stations The addresses of the acknowledge back pagers failing to respond are simulcast transmitted from the remote stations followed by a non-simulcast transmission of those messages for the acknowledge back pagers which acknowledged address transmission from the remote stations. The system described, significantly reduces the number of transmitters required to transmit long messages to a large population of acknowledge back pagers. A system constructed in accordance with the present invention, and having sixteen transmitters for transmitting address and the associated messages, and sixteen receivers for receiving acknowledge back responses from the acknowledge back pagers, would require sixty-four transmitters and receivers using conventional transmission methods to provide the same address and message through-put. The system also provides transmission of the addresses and messages at data bit transmission rates far in excess of what can be delivered in a conventional simulcast communication system.

While specific embodiments of this invention have been shown and described, further modifications and improvements will occur to those skilled in the art. All modifications which retain the same basic underlying principles disclosed and claimed herein are within the scope and spirit of the present invention.

I claim:

1. A method for transmitting addresses and messages to a plurality of acknowledge back pagers operating within a wide area communication system, the communication system comprising a central transmitter station surrounded by a plurality of remote transmitter stations to provide message delivery over a predetermined geographic area, said method comprising the steps of:

transmitting, from the central transmitter station, the addresses of those acknowledge back pagers for which messages are intended;

transmitting, from the central transmitter station the messages intended for those acknowledge back pagers which acknowledge reception of the address transmission from the central station throughout the predetermined geographic area;

transmitting, from the central transmitter station to the remote transmitter stations, the addresses and messages of those acknowledge back pagers failing to acknowledge reception of the address transmission from the central station;

simulcast transmitting, from the remote transmitter stations, the addresses of those acknowledge back pagers previously failing to acknowledge reception of the address transmission from the central transmitter station; and simulcast transmitting, from the remote transmitter stations, the messages intended for those acknowledge back pagers which subsequently acknowledge reception of the address transmission from the remote transmitter stations.

2. The method of transmitting addresses and messages in a wide area communication system according to claim 1, wherein each of said plurality of acknowledge back pagers is assigned to operate on one of N paging channels, and said central transmitter means includes N transmitters for transmitting on each of the N paging channels, and wherein said step of transmitting addresses and associated messages from the central transmitter station includes the step of transmitting the addresses and the associated messages by the central station transmitters in predetermined transmitter groups on N−1 paging channels during a predetermined transmission sequence comprising N transmission time intervals.

3. The method of transmitting addresses and messages in a wide area communication system according to claim 2, wherein said step of transmitting addresses and associated messages from the central transmitter station to the remote transmitter stations includes the step of transmitting the addresses and messages on an Ith channel during a transmission time interval subsequent to the address and associated message transmission from the central transmitter station, where the Ith channel is the Nth transmitter independent of the sequence of N−1 paging channels.

4. The method of transmitting addresses and messages in a wide area communication system according to claim 3, wherein said step of transmitting the addresses and associated messages from the remote transmitter stations, includes the step of simulcast transmitting the addresses and the associated messages on the Ith channel, from one or more of the remote transmitter stations during the subsequent transmission time interval.

5. The method of transmitting addresses and messages in a wide area communication system according to claim 2, wherein N paging channels corresponds to at least two paging channels.

6. The method for transmitting addresses and messages in a wide area communication system according to claim 1, wherein said step of transmitting messages from the central transmitter station comprises the step of transmitting the acknowledge back pager address followed by the associated message.

7. The method for transmitting addresses and messages in a wide area communication system according to claim 1, wherein said step of transmitting addresses and messages from the central transmitter station comprises the step of transmitting the addresses and the messages at a first data bit rate.

8. The method for transmitting addresses and messages in a wide area communication system according to claim 7, wherein said step of transmitting addresses from the remote stations comprises the step of transmitting the addresses at a second data bit rate which is lower then the first data bit rate.

9. The method for transmitting addresses and messages in a wide area communication system according to claim 8, wherein said step of transmitting messages from the remote transmitter stations comprise the step of transmitting the associated message at the first data bit rate.

10. A wide area communication system for providing message delivery over a predetermined geographic area to a plurality of acknowledge back pagers, said system comprising:
   a central transmitter station, and a plurality of remote transmitter stations surrounding said central transmitter station,
   said central transmitter station comprising
      central transmitter means, for transmitting the addresses of those acknowledge back pagers for which messages are intended,
      said central transmitter means further transmitting the messages intended for those acknowledge back pagers which acknowledge reception of the address transmission from the central station throughout the predetermined geographic area, and
      said central transmitter means, further transmitting to said plurality of remote transmitter stations, the addresses and messages of those acknowledge back pagers failing to acknowledge reception of the address transmission from the central station throughout the predetermined geographic area;
   said plurality of remote transmitter stations comprising
      remote transmitter means for simulcast transmitting the addresses of those acknowledge back pagers previously failing to acknowledge reception of the address transmission from said central transmitter station, and
      said remote transmitter means further for simulcast transmitting the messages intended for those acknowledge back pagers which subsequently acknowledge reception of the address transmission from said remote transmitter stations.

11. The wide area communication system according to claim 10, wherein each of said plurality of acknowledge back pagers is assigned to operate on one of N paging channels, said central transmitter means includes N transmitters for transmitting on each of the N paging channels, and said remote transmitter means includes a transmitter capable of selectively transmitting on each of the N paging channels.

12. The wide area communication system according to claim 11, wherein
   said central transmitter means includes N acknowledge back receivers, each assigned to receive acknowledge back responses on one of N acknowledge back channels, said N transmitters being responsive to said N acknowledge back receivers for transmitting the messages intended for those acknowledge back pagers which acknowledge reception of the address transmission from said central transmitter station, and wherein
   said remote transmitter means includes an acknowledge back receiver which is capable of selectively receiving on each of the N acknowledge back channels, said remote transmitter being responsive to said acknowledge back receiver for selectively transmitting on each of the N paging channels the messages intended for those acknowledge back pagers which acknowledge reception of the address transmission from said remote transmitter stations.

13. The wide area communication system according to claim 12, wherein the transmissions of the addresses on each of the N paging channels is interleaved to allow sequential reception of the acknowledge back responses from the acknowledge back pagers responding on each of the N acknowledge back channels, whereby said central transmitter means includes a single acknowledge back receiver which is capable of sequentially receiving the acknowledge back responses on each of the N acknowledge back channels.

14. The wide area communication system according to claim 10, wherein the addresses and the associated messages intended for the acknowledge back pagers are transmitted by said central station transmitters in predetermined transmitter groups of N−1 paging channels during a predetermined transmission sequence comprising N transmission time intervals.

15. The wide area communication system according to claim 14, wherein the addresses and associated messages of those acknowledge back pagers failing to respond to said central transmitter station transmission are transmitted by said central transmitter means on an Ith paging channel to said remote transmitter stations during a transmission time interval subsequent to the address and associated message transmission from said central transmitter station, where the Ith channel is the Nth transmitter independent of the sequence of N−1 paging channels.

16. The wide area communication system according to claim 15, wherein the addresses and the associated messages are further transmitted on the Ith channel, from the remote transmitter stations, during the subsequent transmission time interval.

17. The wide area communication system according to claim 10, wherein N paging channels correspond to at least two paging channels.

18. The wide area communication system according to claim 10, wherein the addresses and the associated messages are transmitted at a first data bit rate from the central station.

19. The wide area communication system according to claim 18, wherein the addresses are transmitted at a second data bit rate, which is lower than the first data bit rate, from said remote transmitter stations.

20. The wide area communication system according to claim 19, wherein the message is transmitted from said remote transmitter stations at the first data bit rate.

21. The wide area communication system according to claim 10, wherein said central transmitter means transmits the acknowledge back pager address and the associated message when transmitting the messages of those acknowledge back pagers acknowledging reception of the address transmission from the central transmitter station.

* * * * *